June 27, 1967

F. WHITE 3,327,511

APPARATUS AND METHOD FOR MAKING PLEATED CAPSULES OR THE LIKE

Filed Feb. 26, 1964

INVENTOR.
FREDERICK WHITE

BY Glenn Palmer &
Matthews
HIS ATTORNEYS

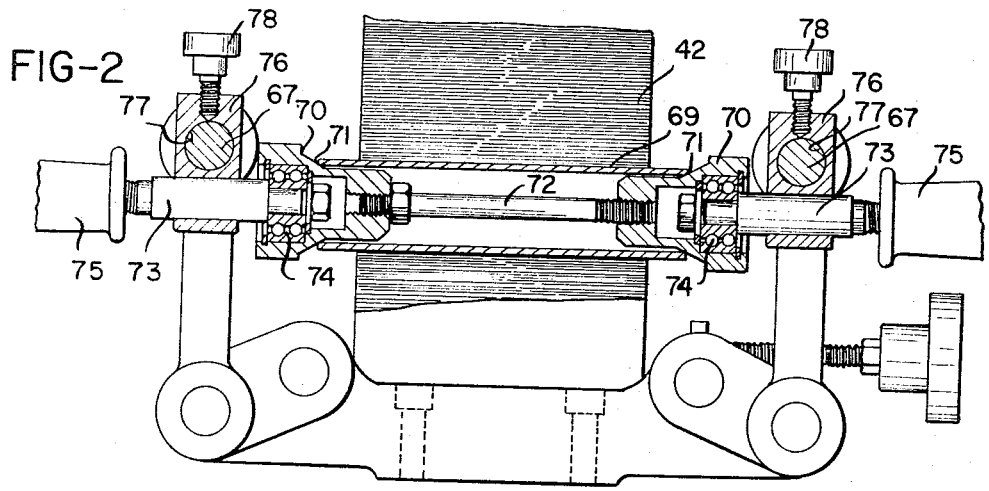

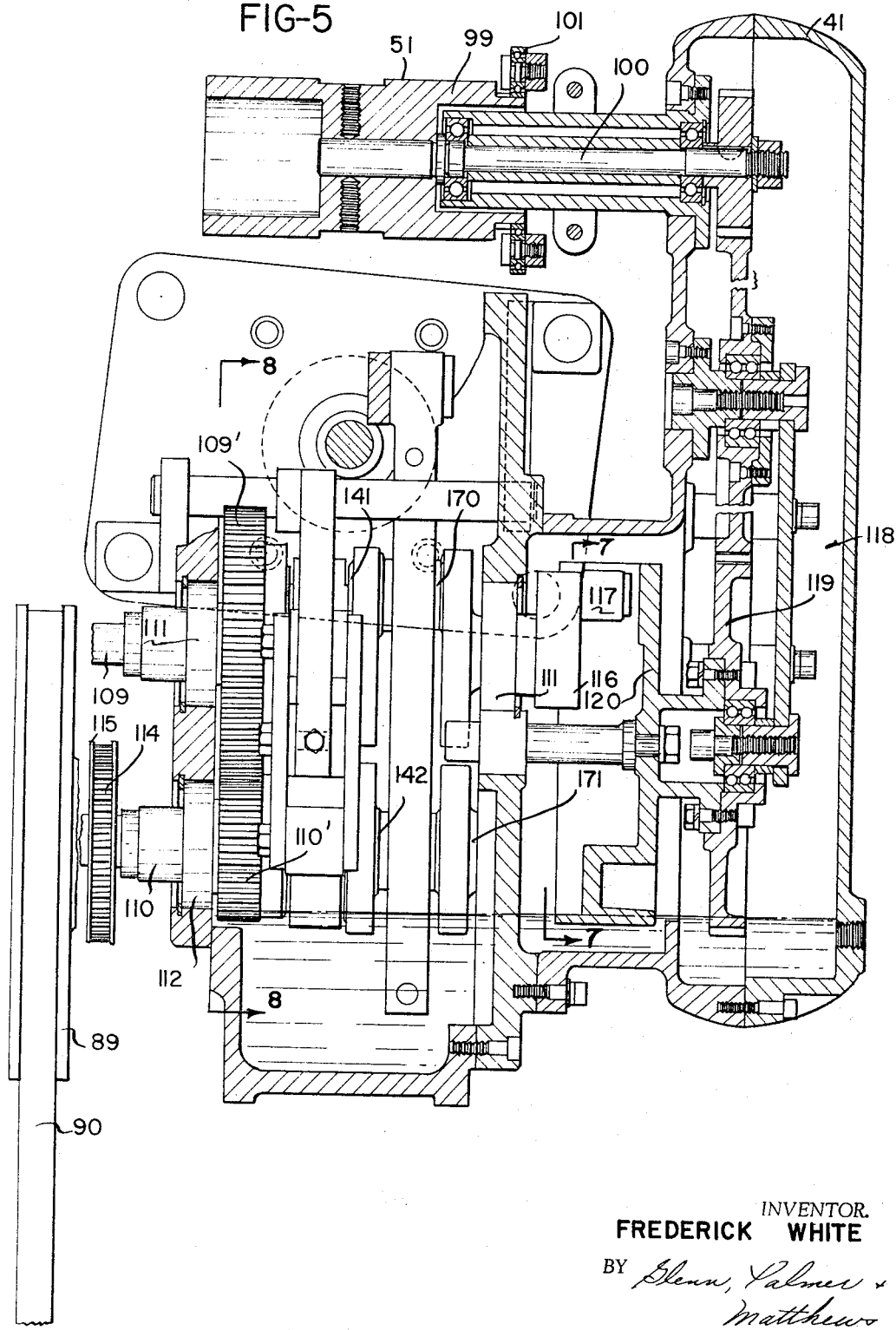

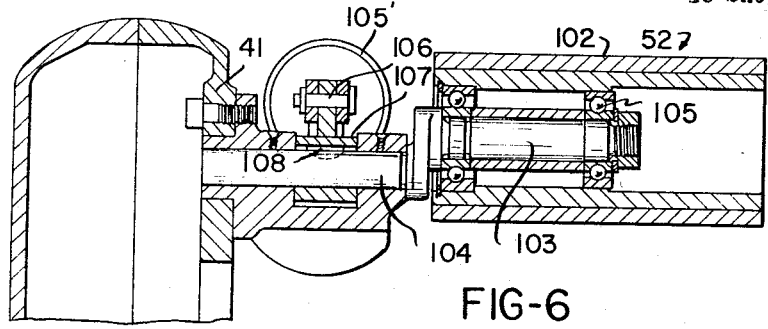
FIG-6
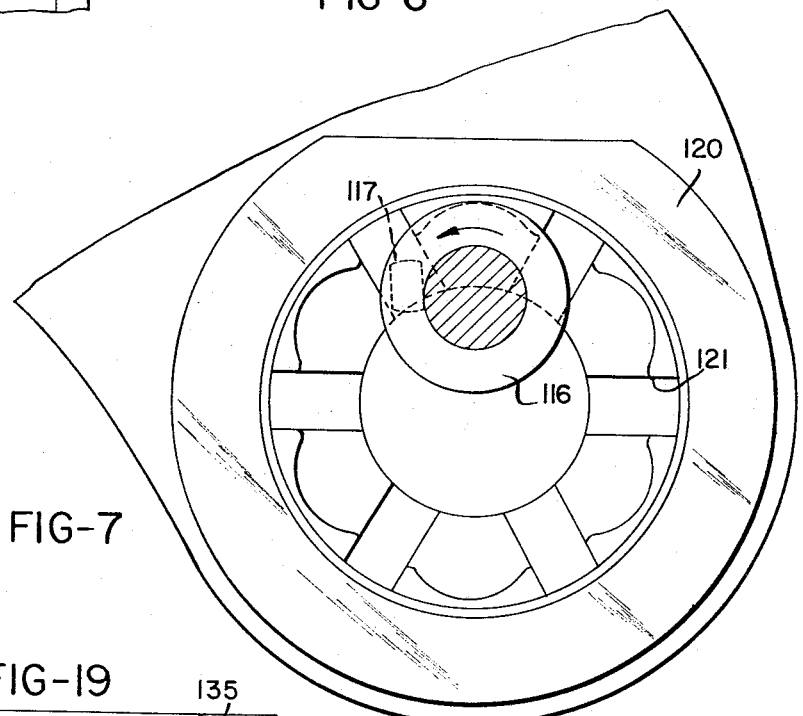
FIG-7
FIG-19
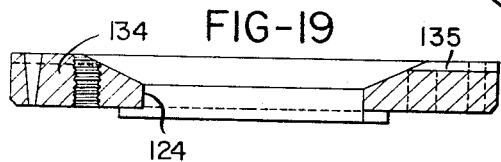
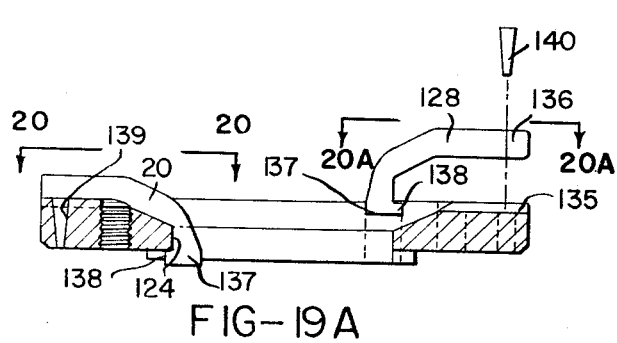
FIG-19A
FIG-20
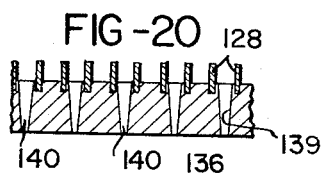
FIG-20A
INVENTOR.
FREDERICK WHITE
BY Glenn, Palmer &
Matthews
HIS ATTORNEYS

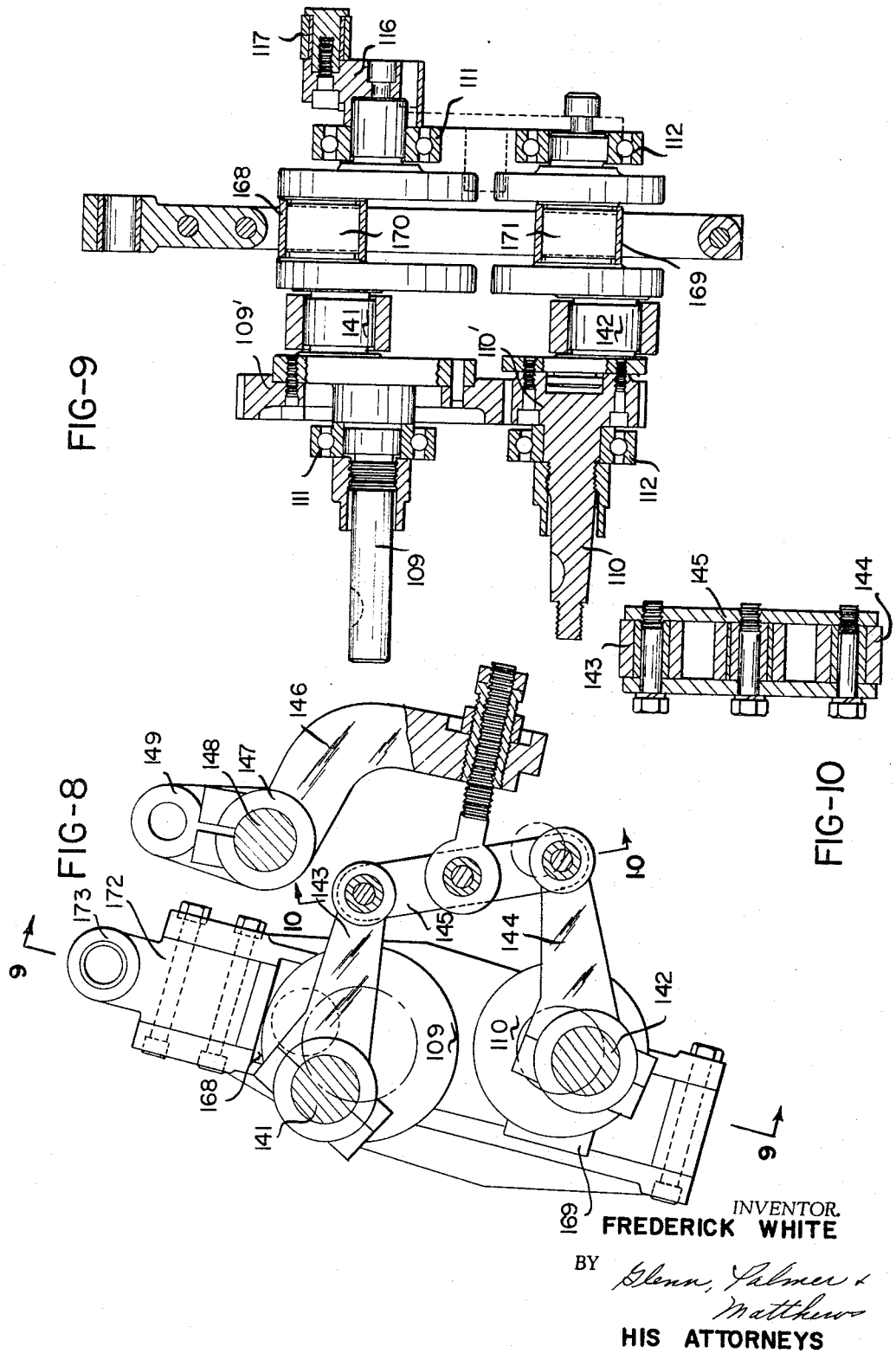

June 27, 1967 F. WHITE 3,327,511
APPARATUS AND METHOD FOR MAKING PLEATED CAPSULES OR THE LIKE
Filed Feb. 26, 1964 16 Sheets-Sheet 6
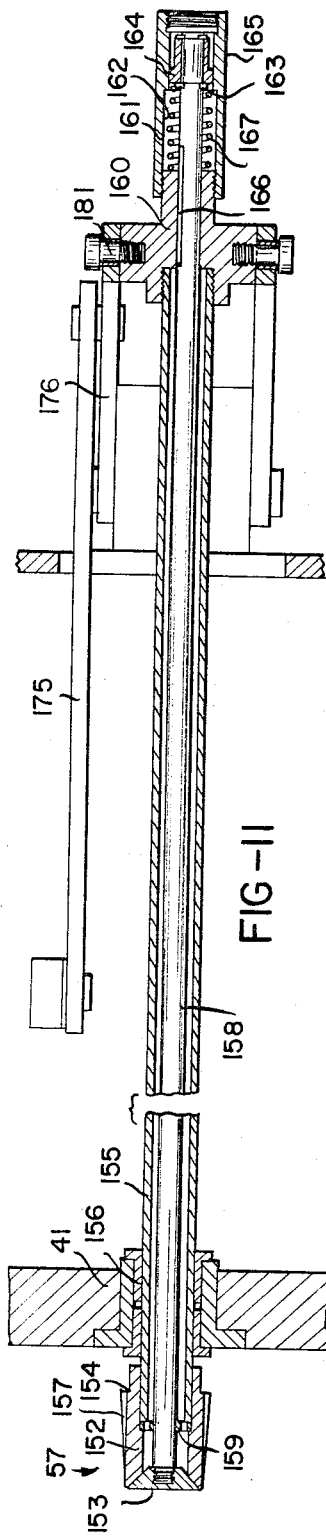
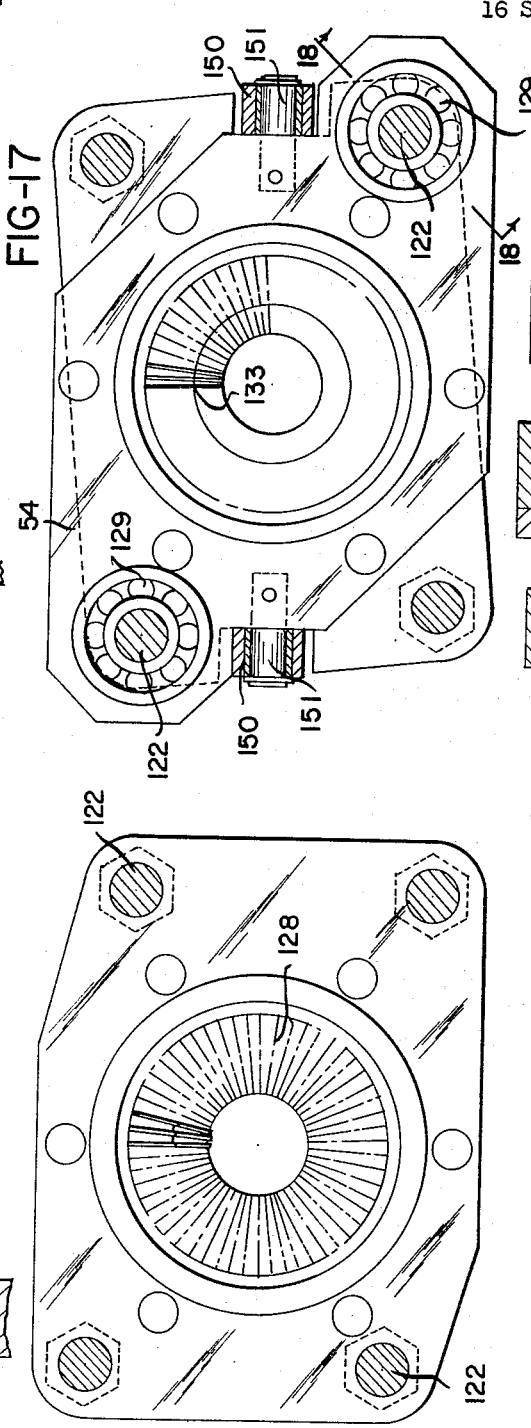
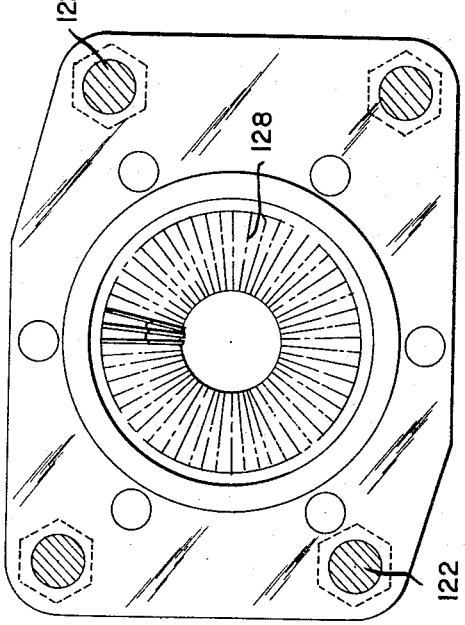
INVENTOR.
FREDERICK WHITE
BY Glenn, Palmer &
Matthews
HIS ATTORNEYS

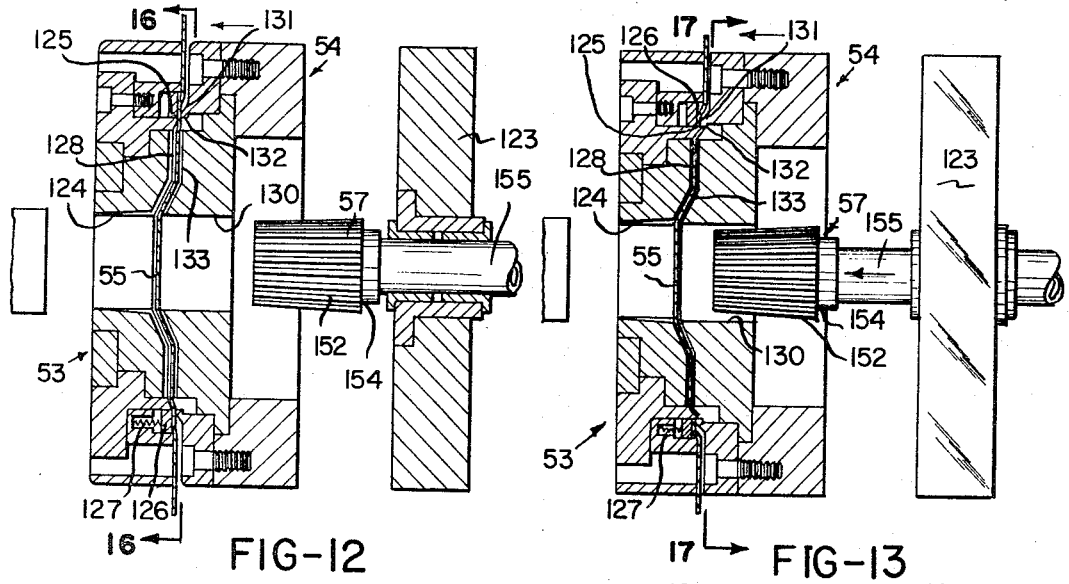
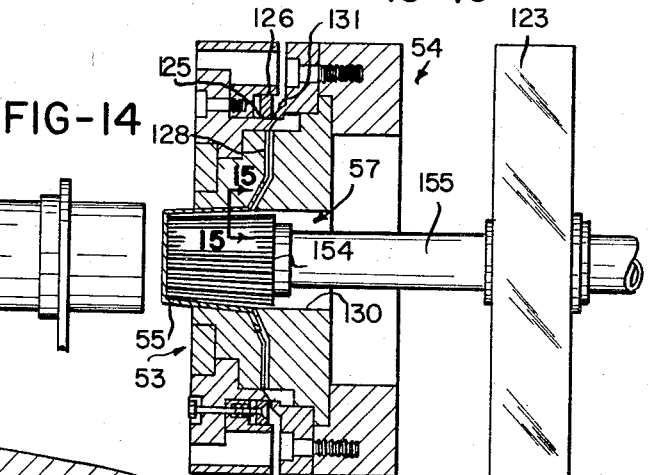
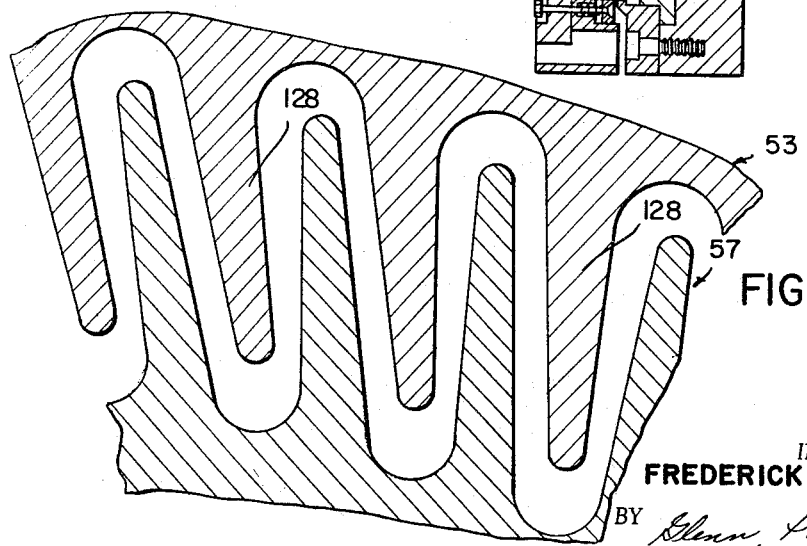

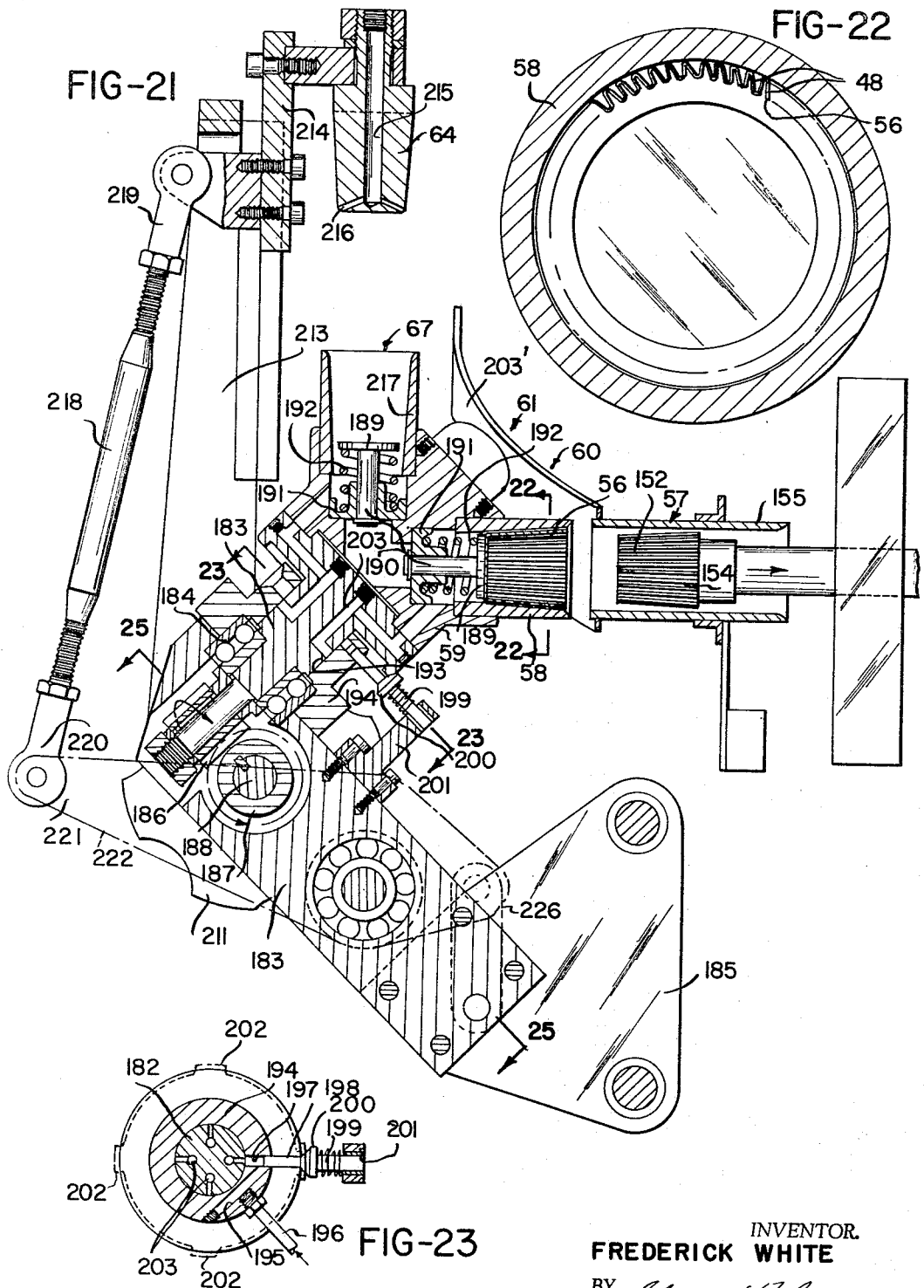

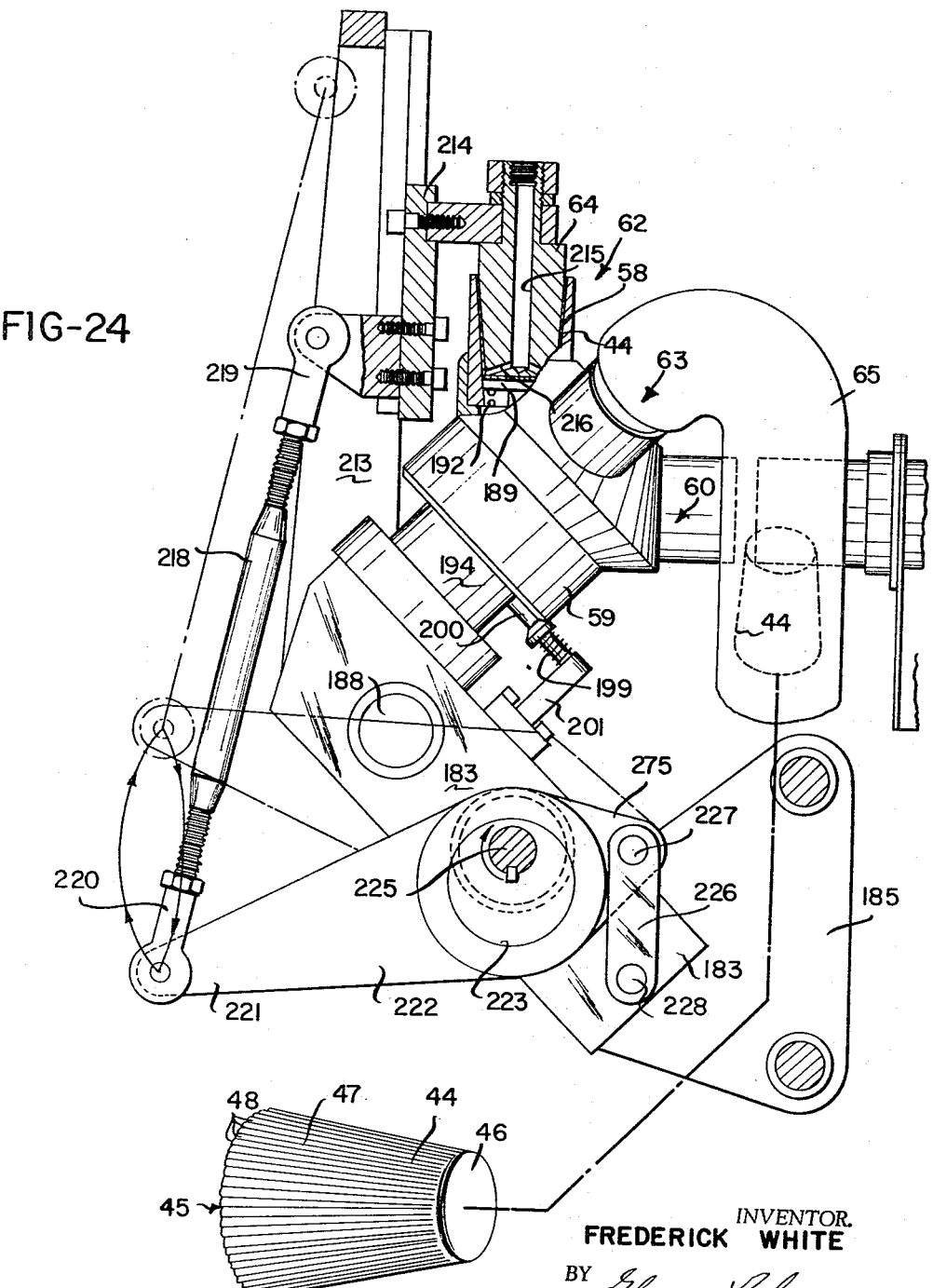

June 27, 1967  F. WHITE  3,327,511
APPARATUS AND METHOD FOR MAKING PLEATED CAPSULES OR THE LIKE
Filed Feb. 26, 1964  16 Sheets-Sheet 10
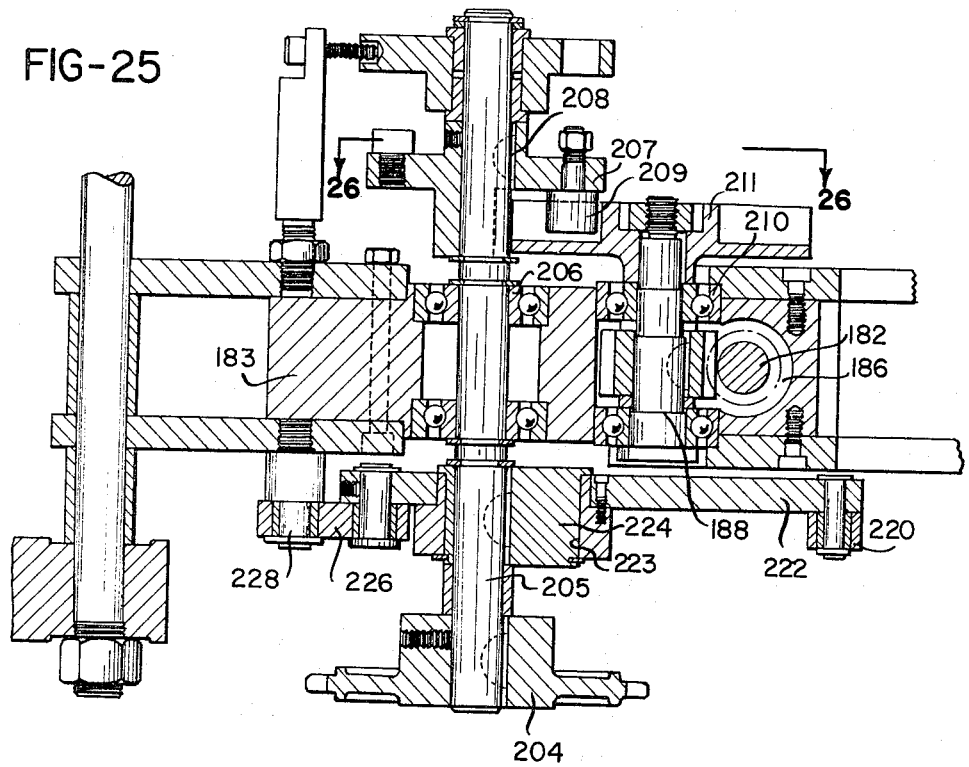
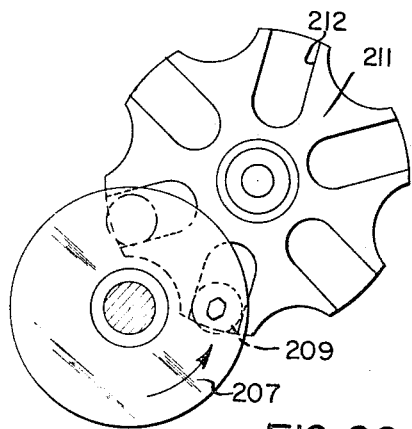
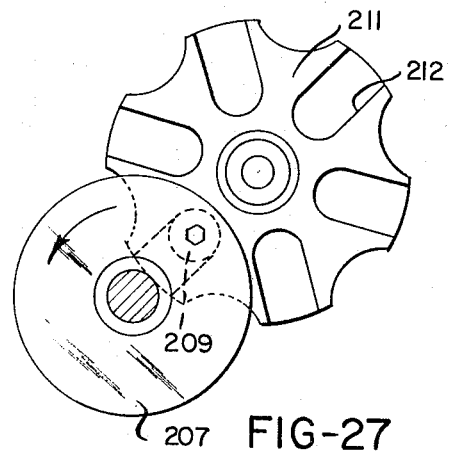
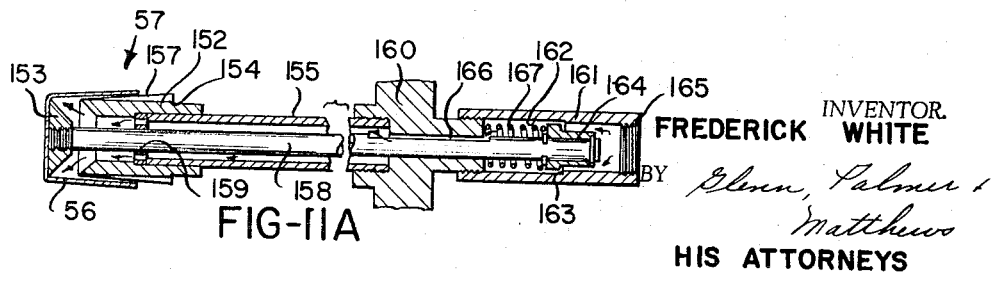
INVENTOR.
FREDERICK WHITE
BY Glenn, Palmer
Matthews
HIS ATTORNEYS

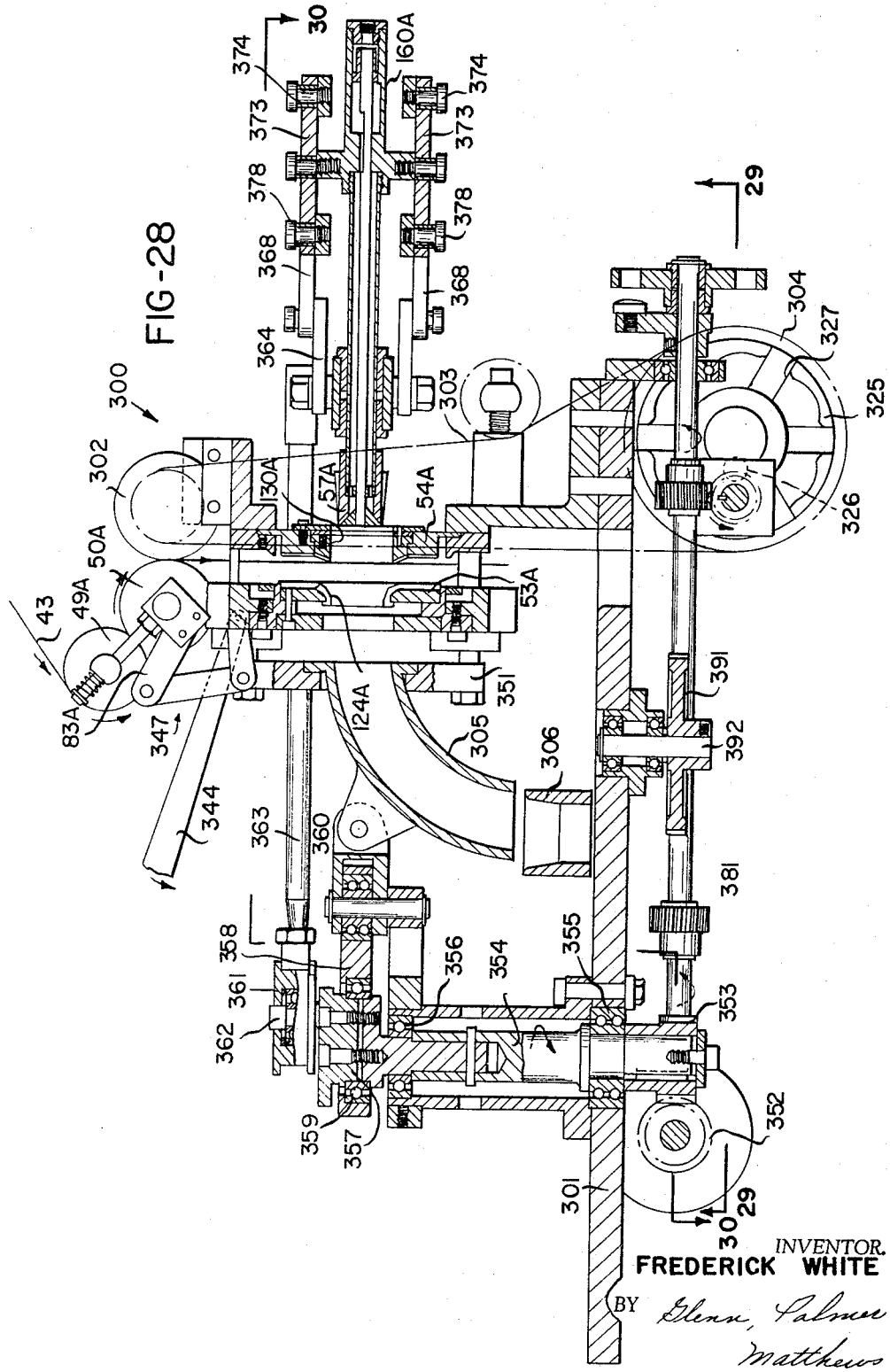

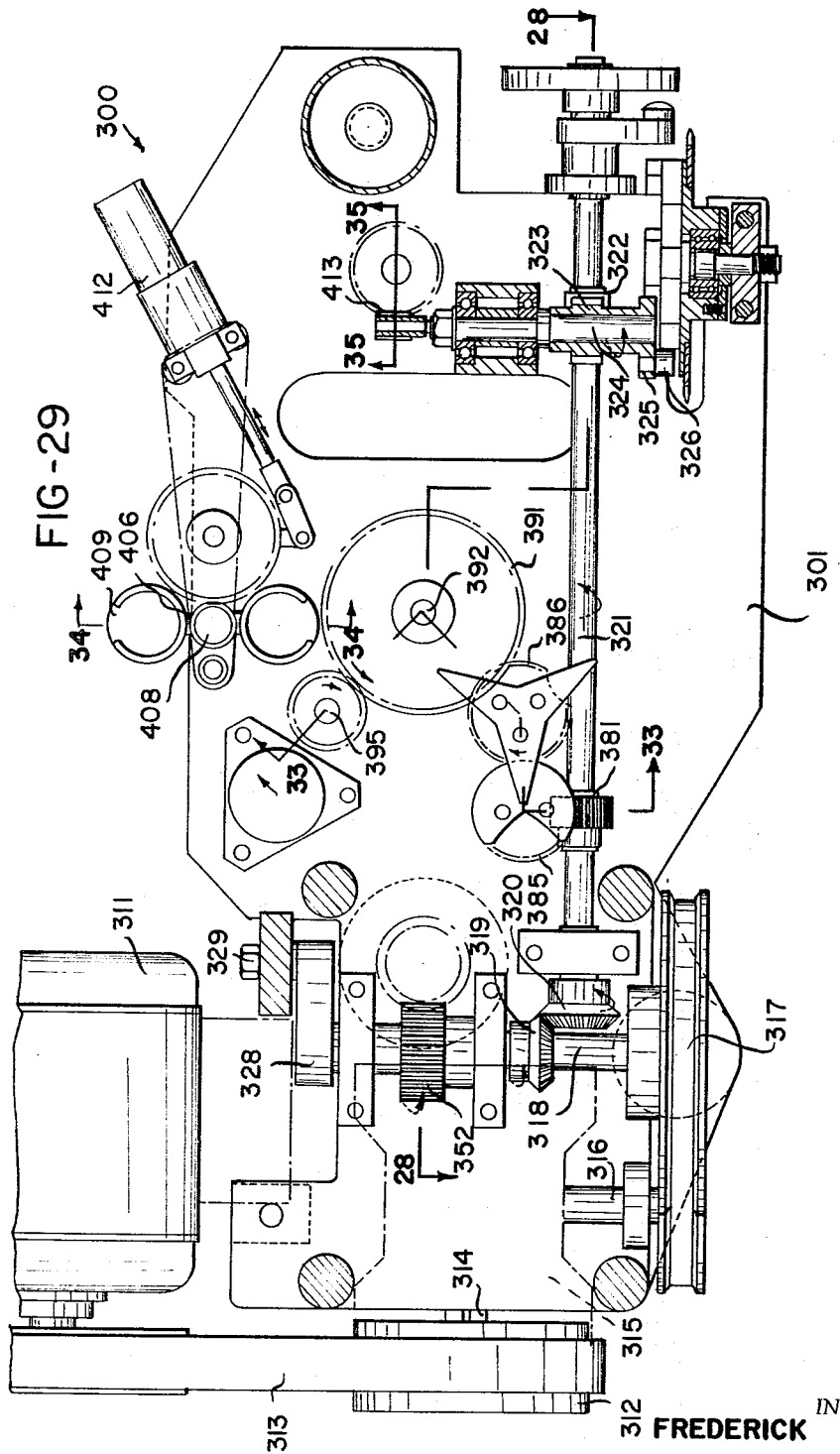

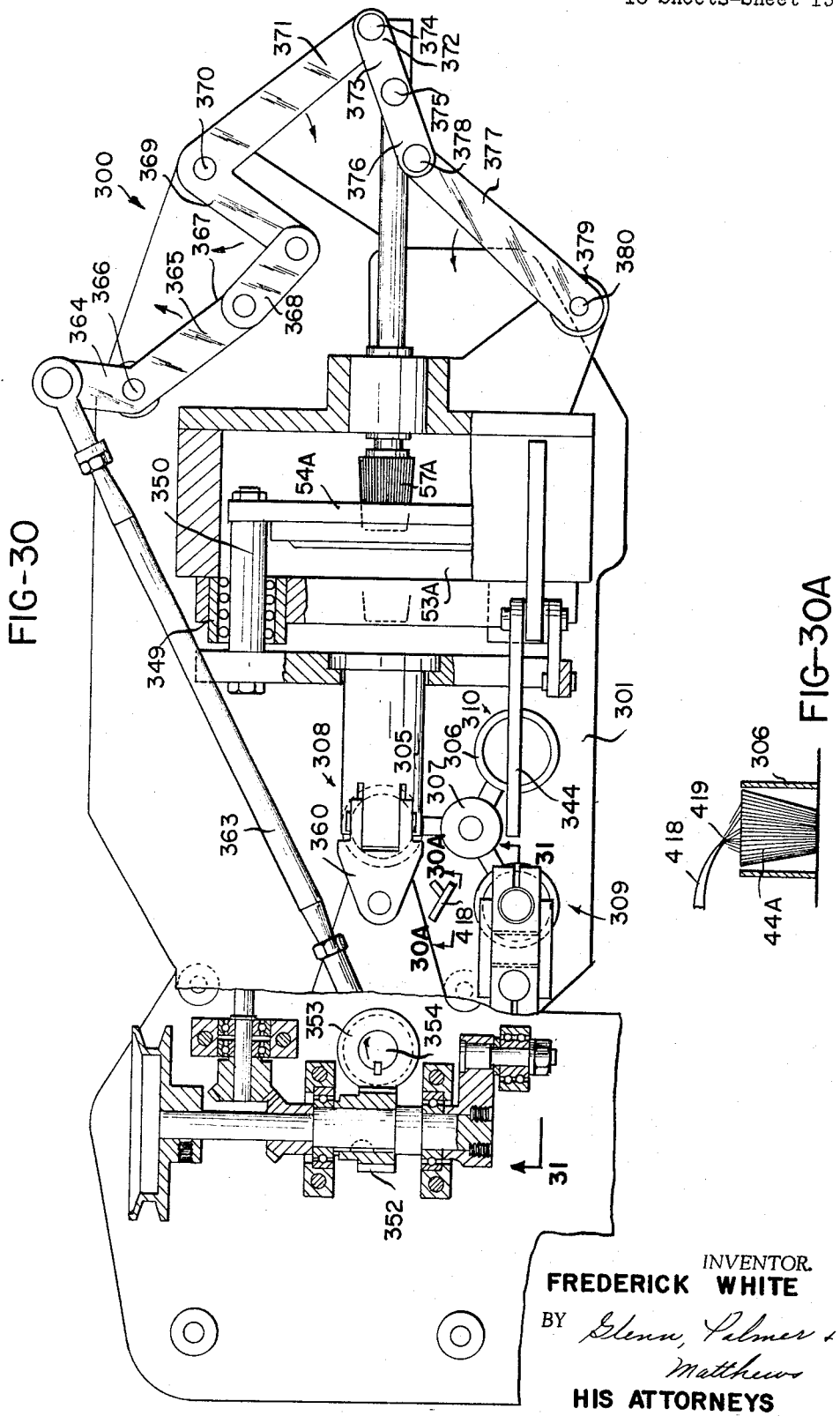

June 27, 1967  F. WHITE  3,327,511
APPARATUS AND METHOD FOR MAKING PLEATED CAPSULES OR THE LIKE
Filed Feb. 26, 1964  16 Sheets-Sheet 14

INVENTOR.
FREDERICK WHITE
BY Glenn, Palmer & Matthews
HIS ATTORNEYS

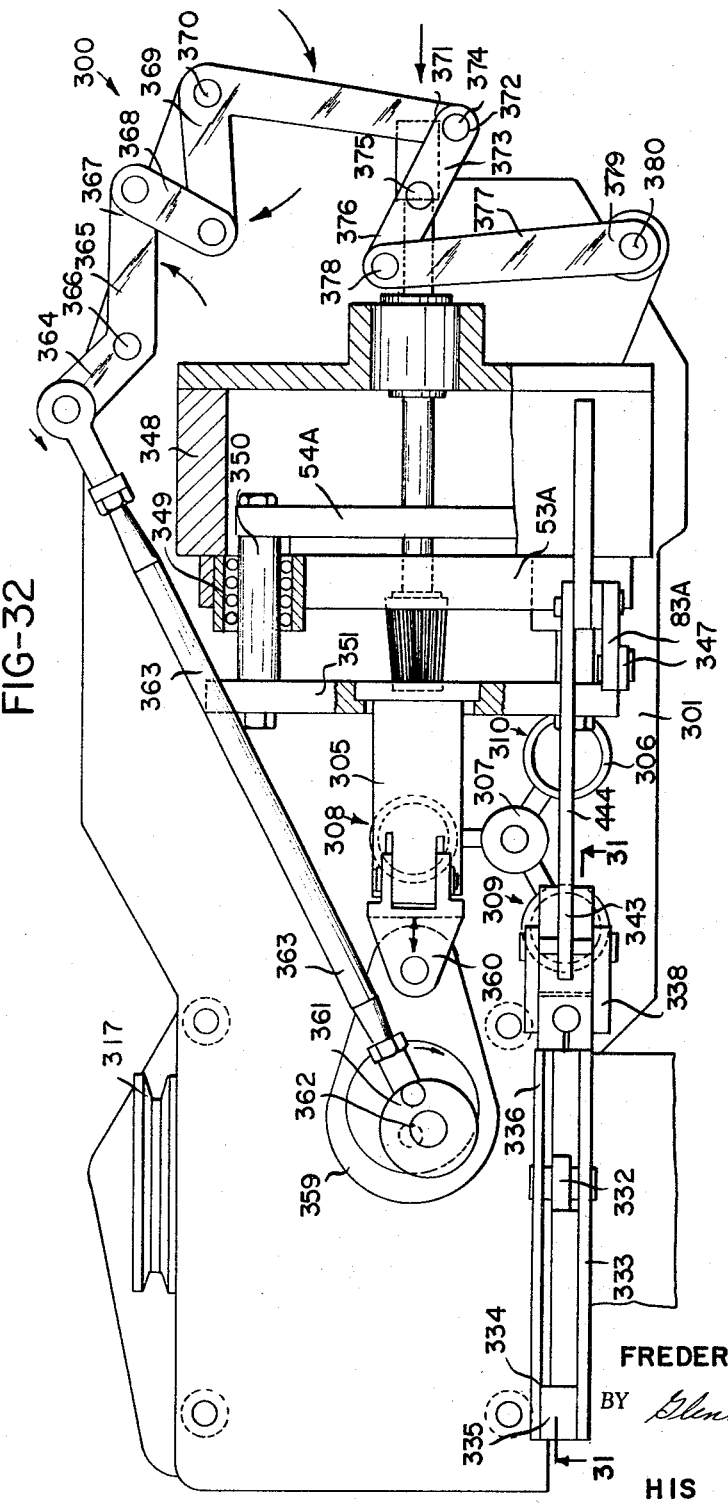

June 27, 1967            F. WHITE            3,327,511
APPARATUS AND METHOD FOR MAKING PLEATED CAPSULES OR THE LIKE
Filed Feb. 26, 1964            16 Sheets-Sheet 16
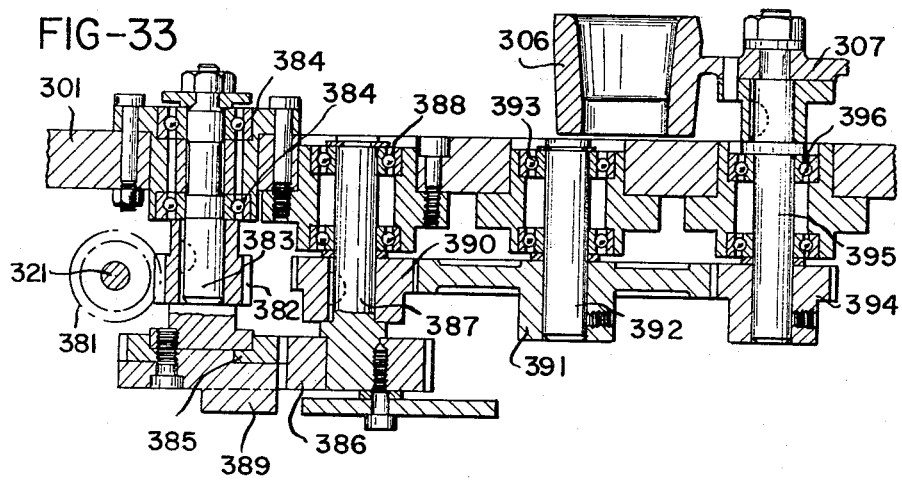
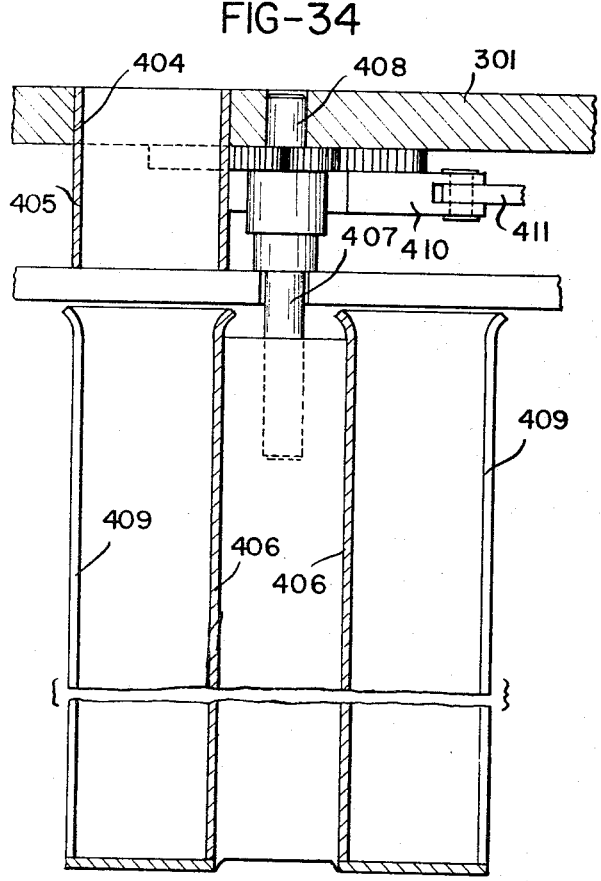
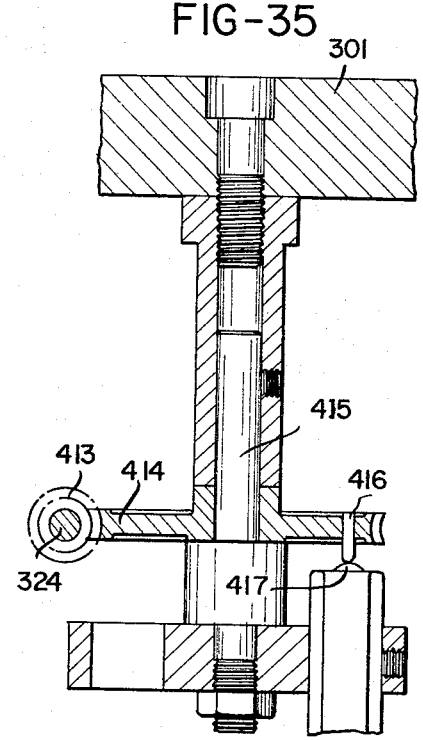
INVENTOR.
FREDERICK WHITE
BY *Glenn, Palmer & Matthews*
HIS ATTORNEYS

United States Patent Office 3,327,511
Patented June 27, 1967

3,327,511
APPARATUS AND METHOD FOR MAKING PLEATED CAPSULES OR THE LIKE
Frederick White, Henrico County, Va., assignor to Reynolds Metals Company, Richmond, Va., a corporation of Delaware
Filed Feb. 26, 1964, Ser. No. 347,602
32 Claims. (Cl. 72—348)

This invention relates to an improved method and apparatus for making pleated capsules, such as frusto-conical metallic foil capsules, having the smaller ends thereof closed and having the tapering side walls thereof provided with flattened, overlapping pleats whereby the capsules are adapted to be disposed over the necks of beverage bottles or the like to decoratively cover the conventional closure caps of the bottles or the like.

It is well known that such pleated capsules have been formed in the past by suitable methods and apparatus wherein each capsule is formed by cutting a substantially circular blank from an indexing sheet of material and, thereafter, by forming the circular blank into the above-described pleated capsule, the sheet of material normally comprising metallic foil, such as aluminum-containing metallic foil or the like.

However, it has been found that the prior known methods and apparatus were only adapted to produce about seventy of such capsules per minute whereas, according to the teachings of this invention, it has been found that the method and apparatus of this invention will produce approximately one hundred and forty such capsules per minute.

Accordingly, it is an object of this invention to provide an improved apparatus for making pleated capsules and the like, the apparatus of this invention having one or more of the novel features as hereinafter set forth and illustrated.

Another object of this invention is to provide an improved method for making such a capsule or the like, the method of this invention having one or more of the novel features of this invention as hereinafter set forth or illustrated.

Other objects, uses and advantages of this invention are apparent from a reading of this description which proceeds with reference to the accompanying drawings forming a part thereof and wherein:

FIGURE 2 is an enlarged, fragmentary, cross-sectional view taken on line 2—2 of FIGURE 1.

FIGURE 3 is an enlarged, fragmentary cross-sectional view taken on line 3—3 of FIGURE 1.

FIGURE 4 is a fragmentary side view taken substantially on line 4—4 of FIGURE 3.

FIGURE 5 is an enlarged, fragmentary, cross-sectional view taken substantially on line 5—5 of FIGURE 1.

FIGURE 6 is an enlarged, fragmentary, cross-sectional view taken on line 6—6 of FIGURE 1.

FIGURE 7 is an enlarged, fragmentary, cross-sectional view taken on line 7—7 of FIGURE 5.

FIGURE 8 is an enlarged, fragmentary, cross-sectional view taken on line 8—8 of FIGURE 5.

FIGURE 9 is a cross-sectional view taken on line 9—9 of FIGURE 8.

FIGURE 10 is a cross-sectional view taken on line 10—10 of FIGURE 8.

FIGURE 11 is an enlarged, fragmentary, cross-sectional view of one of the die members of the apparatus of FIGURE 1, FIGURE 11 being taken substantially on line 11—11 of FIGURE 1.

FIGURE 11A is a view similar to FIGURE 11 and illustrates the die member thereof in another operating position thereof.

FIGURE 12 is a fragmentary, cross-sectional view illustrating one position of the three die members of the apparatus of FIGURE 1.

FIGURE 13 is a view similar to FIGURE 12 and illustrates the die members in another operating position thereof.

FIGURE 14 is a view similar to FIGURE 12 and illustrates the die members in still another operating position thereof.

FIGURE 15 is an enlarged, fragmentary, cross-sectional view taken on line 15—15 of FIGURE 14.

FIGURE 16 is a cross-sectional view taken on line 16—16 of FIGURE 12.

FIGURE 17 is a cross-sectional view taken on line 17—17 of FIGURE 13.

FIGURE 18 is a cross-sectional view taken on line 18—18 of FIGURE 17.

FIGURE 19 is a fragmentary cross-sectional view of the die member of FIGURE 16 before the pleat-forming members are secured thereto.

FIGURE 19A is a view similar to FIGURE 19 and illustrates the method of assembling the pleat-forming members to the die member of FIGURE 19.

FIGURE 20 is a cross-sectional view taken on line 20—20 of FIGURE 19A.

FIGURE 20A is a top view of the pleat-forming member illustrated in FIGURE 19A and is taken on line 20A—20A thereof.

FIGURE 21 is an enlarged, fragmentary, cross-sectional view taken substantially on line 21—21 of FIGURE 1.

FIGURE 22 is an enlarged, fragmentary, cross-sectional view taken on line 22—22 of FIGURE 21.

FIGURE 23 is a fragmentary, cross-sectional view taken on line 23—23 of FIGURE 21.

FIGURE 24 is a view similar to FIGURE 21 and illustrates the pleat-flattening operation of the apparatus of FIGURE 1.

FIGURE 25 is a fragmentary, cross-sectional view taken on line 25—25 of FIGURE 21.

FIGURE 26 is a fragmentary, cross-sectional view taken on line 26—26 of FIGURE 25.

FIGURE 27 is a view similar to FIGURE 26 and illustrates the parts thereof in another operating position thereof.

FIGURE 28 is a view similar to FIGURE 1 and illustrates schematically another method and apparatus of this invention.

FIGURE 29 is a bottom view of the apparatus illustrated in FIGURE 28 and is taken substantially on line 29—29 thereof.

FIGURE 30 is a top cross-sectional view of the apparatus illustrated in FIGURE 28 and is taken substantially on line 30—30 thereof.

FIGURE 30A is an enlarged, fragmentary, cross-sectional view of part of the apparatus of FIGURE 30 and is taken on line 30A—30A thereof.

FIGURE 32 is a view similar to FIGURE 30 and illustrates the apparatus in another operating position thereof.

FIGURE 33 is an enlarged, fragmentary, cross-sectional view taken substantially on line 33—33 of FIGURE 29.

FIGURE 34 is an enlarged, fragmentary, cross-sectional view taken on line 34—34 of FIGURE 29.

FIGURE 35 is an enlarged, fragmentary, cross-sectional view taken on line 35—35 of FIGURE 29.

Figure 1:
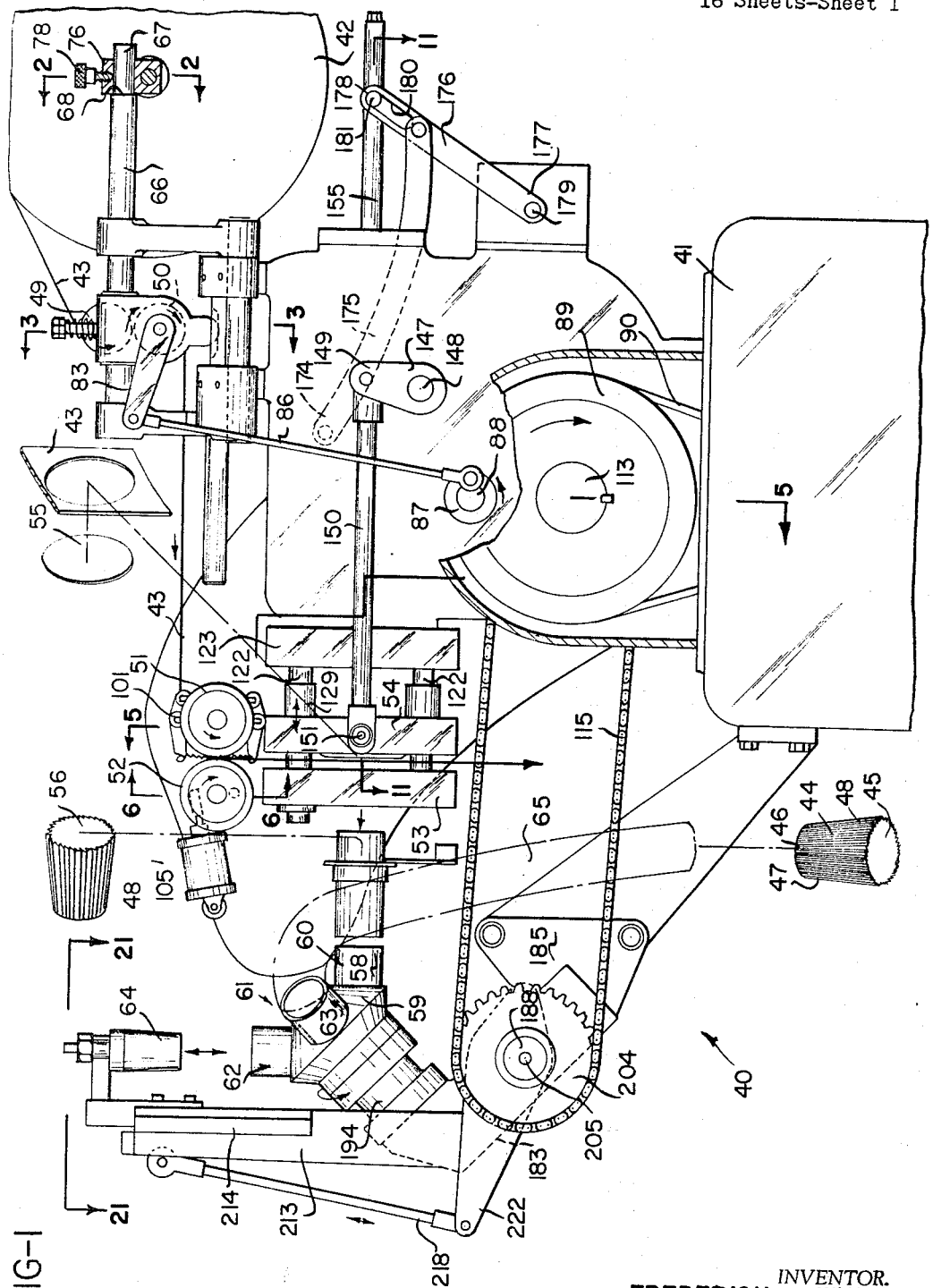
FIGURE 1 is a schematic side view illustrating one of the methods and apparatus of this invention.

While the various features of this invention are hereinafter illustrated and described as being particularly adaptable for forming pleated capsules for bottles or the like, it is to be understood that the various features of this invention can be utilized singly or in any combination thereof to provide other articles as desired.

Therefore, this invention is not to be limited to only the embodiments illustrated in the drawings, because the drawings are merely utilized to illustrate one of the wide variety of uses of this invention.

Referring now to FIGURE 1, one improved method and apparatus of this invention for forming pleated capsules from a strip of metallic foil is generally indicated by the reference numeral 40 and comprises a stationary frame structure 41 carrying a supply roll 42 of a strip of metallic foil 43 which is adapted to be passed through the apparatus 40 and formed into a plurality of pleated capsules in the manner illustrated by the reference numeral 44 in FIGURE 1.

In particular, it can be seen that the completed pleated capsule 44 is substantially a frusto-conical configuration provided with a large open end 45 and a small closed end 46 with the slanting side walls 47 thereof being defined by a plurality of pleats 48 flattened in overlapping relation in a manner hereinafter described to define a structure which is readily insertable over the neck portion of a beverage bottle or the like to decoratively hide the conventional closure thereof.

For example, the pleated capsules 44 of this invention can be formed of plain or colored metallic foil, such as aluminum-containing foil or the like, and can have the closed end 46 thereof embossed with suitable decorative or informational media, as desired, in a manner hereinafter set forth.

The strip of material 43 is adapted to be fed from the supply roll 42 around part of a first roll 49 and through a nip defined between the first roll 49 and a second roll 50 for a purpose hereinafter described whereby the strip of material passes around part of the roll 50 and is fed through a nip of a pair of rolls 51 and 52, the rolls 51 and 52 being operated in a manner hereinafter described to sequentially feed the strip of material 43 down between a pair of die members 53 and 54 which are adapted to cut a circular blank 55 from the strip of material 43 in the manner illustrated in FIGURE 1 and, thereafter, form the circular blank 55 into the intermediate pleated capsule 56 illustrated in FIGURE 1 in cooperation with a third die member 57, FIGURE 12, in a manner hereinafter described.

In particular, the intermediate pleated capsule 56 has the pleats 48 thereof angularly disposed relative to the side wall 47 thereof but the same have not been flattened against each other in overlapping relation in the manner illustrated by the reference numeral 44 in FIGURE 1.

The intermediate completed capsule 56 is adapted to be ejected from the die means 53 and 54 in a manner hereinafter described and be forced through a guiding tube 57 into a cup-like member 58 of an indexing, turret-like head 59.

The turret head 59 sequentially indexes the cups 58 through four stations 60, 61, 62, and 63. When each cup 58 is at the station 60, the same receives the intermediate capsule 56 in the open end thereof. When the cup 58 is indexed to station 61, no operating function is performed on the incomplete capsule 56. However, when the particular cup 58 is indexed to the station 62, a pleat-flattening member 64 is moved vertically downwardly into the particular cup 58 to cooperate therewith and flatten the pleats 48 of the capsule 56 in overlapping relation in the manner illustrated by reference numeral 44 in FIGURE 1 to complete the capsule 44.

Thereafter, the particular cup 58 is indexed by the head 59 to the station 63 whereby the completed capsule 44 is ejected from the particular cup 58 in a manner hereinafter described into a discharge chute 65 which leads to a suitable hopper or the like whereby the completed capsules 44 can be packaged for storage and shipment purposes.

Therefore, it can be seen that the method and apparatus 40 of this invention operates in an effective manner to form the capsule 44 from the strip of material 43 in such a manner that approximately one hundred and forty capsules 44 can be formed by the method and apparatus 40 of this invention per minute whereas in the past it has been found that the prior known methods and apparatus can only form approximately seventy such completed capsules per minute.

The particular details of the apparatus 40 of this invention will now be described.

SUPPLY ROLL 42

As illustrated in FIGURES 1 and 2, the frame structure 41 of the apparatus 40 includes a pair of rearwardly extending and substantially horizontal rods 66 each having a reduced end portion 67 which defines a shoulder 68 with the particular rod 66.

The supply roll 42 is adapted to be detachably secured on the end portions 67 of the rods 66 in a manner now to be described.

The supply roll 42 is mounted on a hollow tubular member 69 which is adapted to receive a pair of end members 70 respectively received in the opposed ends 71 of the tubular member 69, the end members 70 being respectively interconnected together by a tightening bar 72 and being respectively rotatably mounted to handle shafts 73 by bearing means 74. Each handle shaft 73 has a handle 75 interconnected to the outer end thereof whereby the operator of the apparatus 40 is adapted to lift the supply roll 42 in place by merely grasping the handle portions 75.

Each handle shaft 73 has a block 76 telescoped thereon in the manner illustrated in FIGURE 2 and has a transverse bore 77 passing therethrough and adapted to telescopically receive an end portion 67 of a rod 66 in the manner illustrated in FIGURE 2. A lock screw 78 is carried by each block 76 and is adapted to tighten against a respective end portion 67 of a rod 66 when turned in the proper direction to lock the supply roll 42 in place.

Therefore, it can be seen that when the operator wishes to place a supply roll 42 in the apparatus 40, he merely lifts the supply roll 42 by the handle portions 75 and telescopes the blocks 76 thereof over the end portion 67 of the rods 66 until the blocks 76 abut the shoulders 68 whereby the supply roll 42 is disposed in the proper position. Thereafter, the operator merely tightens the lock screws 78 to hold the supply roll 42 in its proper position.

Thus, the strip of material 43 is adapted to be fed from the supply roll 42 as the supply roll 42 is adapted to rotate relative to the rod 66 because of the bearing means 74 previously described.

ROLLS 49 AND 50

The roll 50 of the apparatus 40 includes a tubular member 79, FIGURE 3, rotatably mounted to a shaft 80 by bearing means 81, the shaft 80 being rotatably mounted to the frame means 41 of the apparatus by bearing means 82. Thus, the roll 50 is adapted to rotate relative to the shaft 80, and the shaft 80 is adapted to rotate relative to the roll 50.

An arm 83 is splined to the end 84 of the shaft 80 by a key 85 whereby oscillation of the arm 83, in a manner hereinafter described, causes oscillation of the shaft 80 independently of rotation of the roller 50.

For example, the arm 83 is pivotally interconnected to a rod 86, FIGURE 1, which is, in turn, pivotally interconnected to a cam plate 87 rotatably driven by a shaft 88 whereby rotation of the cam plate 87 causes the rod 86 to oscillate the shaft 80 back and forth for a purpose hereinafter described, the shaft 88 being driven by a suitable power take-off structure from a drive pulley 89, FIGURE 1, driven by a belt 90 which is, in turn, driven whereby the die means 54 is movable toward and away from the stationary die means 53 in a manner hereinafter described.

The die member 54 has an opening 130 passing substantially centrally therethrough and which is coaxially aligned with the opening 124 in the die member 53 for a purpose hereinafter described.

The die member 54 has an outwardly projecting cam member 131 which has a trim surface 132 that cooperates with the trim surface 125 of the die means 53 to cut the circular blank 55 from the strip of material 43 when the die member 54 is moved toward the die member 53 the desired distance as illustrated in FIGURES 12 and 13.

The die member 54 also carries pleat-forming members 133 as illustrated in FIGURES 12 and 17 which substantially radiate outwardly from the opening 130 thereof toward the trim means 131 whereby the pleat-forming members 133 cooperate with the pleat-forming members 128 to initially, radially pleat the outer peripheral portion of the circular blank 55 when the die member 54 has been moved toward the die member 53 the desired distance as illustrated in FIGURE 3.

Means are provided for so controlling the actual movement of the die member 54 relative to the die member 53 so that the same is not spring loaded against the die member 53 as in the prior art because it is found that when the die member 54 or the die member 53 is spring loaded against the other die member 53 or 54, the same tightly hold the blank 55 therebetween so that when the die member 57 is utilized to form the incomplete capsule 56 in a manner hereinafter described, the same tends to tear the central portion out of the blank 55 if the prior known apparatus is speeded to any appreciable degree.

However, because the movement of the die member 54 of this invention relative to the die member 53 is positively controlled so that the same is not tightly compacted against the die member 53, the capsules 44 of this invention can be rapidly formed by the apparatus 40 in such a manner that the apparatus 40 of this invention can produce twice as many capsules as the prior known apparatus.

METHOD OF MAKING THE DIE MEMBERS 53 AND 54

As illustrated in FIGURES 19–20A, the die member 53 includes a plate 134 made of relatively soft material, such as brass or the like, and has a plurality of radially disposed slots 135 formed in the outer periphery thereof to receive the substantially straight portions 136 of the pleat-forming members 128, the pleat-forming members 128 each having an angled end portion 137 adapted to lock around the plate-like member 134 in the manner illustrated in FIGURE 19A because of tang means 138 formed on the end of the pleat-forming member 128.

The plate-like member 134 is provided with a plurality of frusto-conical apertures 139 passing therethrough between each alternating pair of slots 135 in the manner illustrated in FIGURE 20 for a purpose now to be described.

After the pleat-forming members 128 have been assembled in the slots 135 of the plate 134 and have the ends 138 thereof hooked around the plate 134 at the opening 124 thereof, a plurality of frusto-conical pin-like members 140, FIGURE 19A, are wedged into the openings 139 to tend to cause the plate-like member 134 to spread outwardly from the pin-like members 140 to tend to close the slots 135 whereby the pleat-forming members 128 are firmly held by the plate-like member 134.

While the above method has been described in connection with the die member 53, it is to be understood that the same method could be applied to secure the pleat-forming members 133 of the die member 54 thereto.

Therefore, it can be seen that the cooperating portions of the pleat-forming members 128 and 133 of the die members 53 and 54 are substantially radially disposed from the openings 124 and 130 thereof and extend substantially perpendicular out of the front surfaces thereof.

However, the end portions 137 of the pleat-forming members 128 of the die means 53 are angularly disposed relative to the peripheral surface of the opening 124 thereof in the manner illustrated in FIGURE 15 to cooperate with the die member 57 in a manner hereinafter described to substantially angle the pleats 48 of the incomplete capsule 56 relative to the side wall thereof so that the pleats can be subsequently folded flat against each other in overlapping relation in the manner illustrated by the reference numeral 44 in FIGURE 1.

MECHANISM FOR MOVING THE DIE MEMBER 54 RELATIVE TO THE DIE MEMBER 53

As illustrated in FIGURES 8 and 9, the shafts 109 and 110 previously described have crank portions 141 and 142 respectively carrying crank arms 143 and 144, FIGURE 8, tied together by pivotally attached link means 145.

The link means 145 pivotally carries a rocker arm 146 between the opposed ends thereof, the arm 146 having a portion 147 thereof pivotally mounted to the frame means by a pivot pin 148 whereby a free end 149 of the crank arm 146 oscillates back and forth as the shafts 109 and 100 rotate in unison at different speeds.

As illustrated in FIGURE 1, the free end 149 of the crank arm 146 is interconnected to tie bar means 150 respectively interconnected to outwardly directed stub shafts 151, FIGURES 1 and 17, carried by the die means 54 so that as the free end 149 of the crank arm 146 oscillates back and forth, the die means 54 oscillates back and forth on the rods 122 toward and away from the die means 53 to accomplish the blanking and pleating operation previously set forth.

Because the throw of the free end 149 of the crank arm 146 of the apparatus 40 of this invention can be accurately controlled by the proper rotation of the shafts 109 and 110, the die member 54 can be moved toward the die member 53 to the correct position to not only cut the circular blank 55 from the strip of material 53, but also to radially pleat the outer peripheral portion thereof without being tightly compacted against the die member 53 to prevent the die member 57 from tearing the center out of the blank 55 so that the die member 57 can rapidly form the incomplete capsule 56 in a manner hereinafter described.

THE DIE MEMBER 57

As illustrated in FIGURES 11 and 11A, the die member 57 has a frusto-conical end portion 152 defined by a closed end 153 and a larger end 154, the larger end 154 being interconnected to a tubular member 155 slidably mounted in suitable sleeve bearing means 156 carried by the frame means 41 in the manner illustrated in FIGURE 11.

The frusto-conical portion 152 of the die member 57 has outwardly directed pleat-forming members 157 integrally formed with the outer peripheral surface thereof and disposed substantially angularly relatively thereto in the manner illustrated in FIGURE 15 to cooperate with the end portions 137 of the pleat-forming members 128 of the die means 53 to form the pleats 48 of the incomplete capsule 56 at an angle relative thereto as the die member 57 is pushed through the opening 124 of the die means 53 in the manner illustrated in FIGURE 14 and hereinafter described.

The end portion 153 of the die member 57 comprises a substantially poppet type means carried on a rod 158 passing centrally through the tubular member 155 and being slidably mounted thereto by a front bearing means 159 and a rear bearing means 160.

The bearing means 160 includes a fitting for transversely moving the die member 57 toward and away from the die means 53 and 54 in a manner hereinafter described and carries a tubular member 161 on the outer end thereof which has a stepped bore 162 passing thereby a suitable electric motor mounted in the frame means 41.

The roller 49 includes a hollow tubular member 91 rotatably mounted on a shaft 92 by bearing means 93. The shaft 92 is fixed to the shaft 80 so that the shaft 92 will oscillate in an arcuate manner about the shaft 80 as the shaft 80 is oscillated by the arm 83 for a purpose hereinafter described.

For example, the opposed ends of the shaft 92 of the roll 49 have a pair of pins 94 passing through suitable bores 95 formed therein and secured to collars 96 splined to the shaft 80 by key means 97.

A pair of compression springs 98 are respectively disposed about the pins 94 and tend to urge the roll 49 into engagement with the roll 50 at all times.

The operation of the rolls 49 and 50 will now be described.

As illustrated in FIGURES 1 and 4, the strip of material 43 being fed from the supply roll 42 passes around part of the roll 49, through the nip defined between the rolls 49 and 50 and around part of the roll 50 to the feeding rolls 51 and 52.

Since the rolls 51 and 52 only sequentially feed the strip of material 43 between the die members 53 and 54 to have the circular blanks 55 cut therefrom in a manner hereinafter described, the rolls 49 and 50 cooperate together to continuously draw the strip of material 43 from the supply roll 42 at a constant rate regardless of the intermittent feed of the leading end of the strip of material 43 between the die members 53 and 54 so that no braking means are required for the supply roll 42 to provide an intermittent feed therefrom.

In particular, the shaft 80 of the roll 50 is oscillated in such a manner that when the feed rolls 51 and 52 temporarily stop the feeding of the strip of material 43 between the die members 53 and 54 so that a blanking operation can take place, the roll 49 is oscillated to the left in the manner illustrated by full lines in FIGURE 4 whereby the same continues to draw the strip of material 43 from the supply roll 42 at a constant rate although the leading end of the strip of material 53 is being prevented from movement by the rolls 51 and 52.

However, as the rolls 51 and 52 again feed the strip of material 43 down between the die members 53 and 54, the roll 49 is oscillated back to the dotted position illustrated in FIGURE 4 so that the slack of strip of material 43 is taken up by the feeding rolls 51 and 52.

Thus, it can be seen that the rolls 49 and 59 cooperate together to continuously draw the strip of material 43 from the supply roll 42 regardless of the intermittent feed of the leading end of the strip of material between the die members 53 and 54 by the feed rolls 51 and 52.

FEED ROLLS 51 AND 52 AS ILLUSTRATED IN FIGURES 1 AND 5

The feed roll 51 comprises a metallic structure having an externally knurled surface 99 and is fixed to a shaft 100 that is rotatably mounted to the frame means 41 by bearing means 101.

The shaft 100 is adapted to be sequentially rotated in a manner hereinafter described to cause the knurled roll 51 to rotate in the direction indicated by the arrow in FIGURE 1 a desired distance to index an unblanked portion of the sheet of material 43 between the die members 53 and 54 at the proper time.

The cooperating feed roll 52 is illustrated in FIGURES 1 and 6 and has a resilient exterior surface 102, such as is provided by a rubber sleeve or the like. The roll 52 is rotatably mounted on a crank end 103 of a crank shaft 104 by bearing means 105.

The crank shaft 104 is rotatably mounted to the frame means 41 and is adapted to be oscillated by a pneumatic piston and cylinder arrangement 105' having the piston 106 thereof interconnected to a collar 107 splined to the shaft 104 by a key means 108.

In this manner, the piston and cylinder arrangement 105 tends to rotate the shaft 104 to cause the roller 52 to be urged into engagement with the feed roll 51.

Thus, as the feed roll 51 is rotated in the direction indicated by the arrow in FIGURE 1, the other feed roll 52 rotates in unison therewith in the direction indicated by the arrow in FIGURE 1 to feed the strip of material 42 between the die means 53 and 54.

MEANS FOR THE SEQUENTIAL OPERATION OF THE FEED ROLL 51

As illustrated in FIGURES 5, 8 and 9, a pair of crank shafts 109 and 110 are respectively rotatably mounted in the frame means 41 by the bearing means 111 and 112, the shafts 109 and 110 being adapted to be driven by the pulley 89 in any suitable manner.

For example, the crank shaft 110 can be directly interconnected to the shaft 113 of the pulley 89 and can have a sprocket wheel 114 thereon to rotatably drive a drive chain 115, FIGURE 1, for a purpose hereinafter described.

The shaft 110 carries a gear 110' disposed in meshing relation with a gear 109' carried by the shaft 109 whereby rotation of the shaft 110 by the shaft 113 causes simultaneous rotation of the shaft 109 except at a different rate of rotation as will be apparent hereinafter.

The shaft 109 has a cam plate 116 mounted on the end thereof which has a roller 117 or the like mounted off center relative thereto.

The roller or drive cam 117 is adapted to drive a suitable gear train as indicated generally by the reference numeral 118 in FIGURE 5 in a sequential manner to drive the feed roll 51 in the desired sequential pattern to provide intermittent feeding of the strip of material 43 between the die members 53 and 54.

For example, the gear train 118 includes a gear 119, FIGURE 5, rotatably mounted to the frame means 41 and carrying a drive portion 120.

As illustrated in FIGURE 7, the drive portion 120 of the gear 119 has a plurality of radially disposed slots 121 formed therein and extending toward the center of the member 120 but terminating short thereof in the manner illustrated in FIGURE 7.

Thus, as the shaft 109 rotates, the cam member 117 thereof enters a slot 121 and causes the drive member 120 to rotate in unison therewith until the drive member is disposed in the position illustrated in FIGURE 7 whereby the drive member 117 is removed from the particular slot 121 and continues to rotate until the same enters another slot 121 to again cause partial rotation of the drive member 120.

Thus, it can be seen that the shaft 109 is adapted to sequentially rotate the feed roller 51 to cause sequential feeding of the strip of material 43 between the die members 53 and 54.

THE DIE MEMBERS 53 AND 54

As illustrated in FIGURES 1, and 12–18, the die member 53 comprises a substantially rectangular plate fixed to the frame means 41 by a plurality of shafts 122 extending through the die means 54 and being secured to a plate 123, FIGURE 1, fixed to the frame means 41 in any suitable manner.

The die means 53 has an opening 124 passing substantially centrally therethrough and has an outer annular sheet trimming edge 125 surrounded by a movable annular member 126 normally urged to the right in FIGURE 12 by compression spring means 127.

A plurality of pleat-forming members 128, FIGURES 12 and 19–20A, extend inwardly from the trimming surface 125 of the die means 53 and extend into the opening 124 thereof in a manner hereinafter described.

The die means 54 comprises a substantially rectangular plate, FIGURE 17, slidably mounted on a pair of diagonally disposed rods 122 by bearing means 129 through and defining a shoulder 163 interiorly of the same.

A valve member 164 is carried on the end of the rod 158 of the die member 57 and normally seals closed the bore 162 of the fitting 161 when the valve member 164 is disposed in the smaller portion thereof in the manner illustrated in FIGURE 11.

However, when fluid under pressure, such as pressurized air or the like, is directed into the opened end 165 of the fitting 161, the same acts against the valve 164 to drive the rod 158 to the left from the position illustrated in FIGURE 11 to the position illustrated in FIGURE 11A to cause the poppet portion 153 of the die member 57 to move away from the same to loosen the incomplete capsule 56 thereon in a manner hereinafter described so that the same can be readily ejected therefrom in the manner now to be described.

In particular, as the piston 164 is moved to the left from the position illustrated in FIGURE 11 to the position illustrated in FIGURE 11A, the air being directed into the open end 165 of the fitting 161 subsequently passes around the valve member 164 when the same is disposed in the larger portion of the bore 162 and passes along a groove 166 formed in the rod 158 into the tubular member 155. The air is adapted to pass from the tube 155, through suitable apertures formed in the bearing means 158, out of the now opened end of the valve member 57 to blow the incompleted capsule 56 off the end thereof because the same has been loosened by the moved poppet portion 153, and the poppet portion 153 has provided an outlet for the air pressure being directed through the die means 57 to cause the incomplete capsule 56 to be ejected therefrom into the guide tube 57 previously described leading to one of the cups 58 of the turret head 59.

After the poppet end 153 has been utilized to loosen the capsule 56 and to eject the capsule 56 from the die member 57, the same is adapted to be returned to the position illustrated in FIGURE 11 by a compression spring 167 disposed between the fitting 156 and the valve member 164.

MEANS FOR MOVING THE DIE MEMBER 57 RELATIVE TO THE DIE MEMBERS 53 AND 54

As illustrated in FIGURES 8 and 9, a pair of blocks 168 and 169 are respectively carried by the crank portions 170 and 171 of the shafts 109 and 110, the blocks 168 and 169 being slidably disposed in and interconnected to a crank arm 172 which has a free end 173 that will be oscillated back and forth as the shafts 109 and 110 rotate in unison at different speeds.

As illustrated in FIGURE 1, the free end 173 of the crank arm 172 is interconnected to one end 174 of an arcuate lever 175 having the other end thereof pivotally interconnected to a link 176 intermediate the ends 177 and 178 thereof. The link 176 has the end 177 thereof pivotally mounted to the frame means 41 by a pivot pin 179 and has the other end thereof provided with an elongated slot 180 respectively receiving a pivot pin 181 of the frame 160 in the manner illustrated in FIGURE 11 whereby oscillation of the free end 173 of the crank arm 172 causes the die member 57 to be moved toward and away from the die members 53 and 54.

Thus, after the die members 53 and 54 have moved together in the manner illustrated in FIGURES 12 and 13 to cut the circular blank 53 from the strip of material 43 and radially pleat the outer peripheral portion thereof, the die member 57 is moved to the left through the opening 130 of the die means 54 until the closed end 153 thereof compacts against the central portion of the blank 55 and forces the same through the opening 124 in the die member 53 in the manner illustrated in FIGURE 14.

As the blank 55 is forced through the opening 124 of the die member 53 by the die member 57, the same is formed into the incompleted capsule 56 in the manner illustrated in FIGURE 1 by the cooperation of the pleat-forming members 157 and 128 of the die members 57 and 53.

After the die member 57 has passed through the opening 124 of the die member 53, the same is received in the guide tube 57 in the manner illustrated in FIGURE 21 whereby the poppet end 153 of the die member 57 is moved outwardly in the manner previously described to loosen the capsule 56 on the die member 57 and to permit air to eject the same through the guide member 57 into the receiving cup 58 of the turret head 59 in the manner illustrated in FIGURE 21.

THE TURRET HEAD 59

As illustrated in FIGURES 21 and 24, the turret head 59 includes a shaft-like portion 182 rotatably mounted to a substantially rectangular block 183 by bearing means 184, the rectangular block 183 being mounted to the frame means 41 by bracket means 185.

The shaft-like portion 182 of the turret head 59 carries a beveled gear 186 disposed in meshing relation with a beveled gear 187 fixed to a rotatable shaft 188.

The shaft 188 is adapted to be sequentially rotated in a manner hereinafter described to sequentially index the cups 58 of the turret heads 59 to the various stations 60–63 in a manner hereinafter set forth.

Each cup-like member 58 has a bottom wall member 189 carried on a shaft 190 passing through a fixed fitting 191 whereby each bottom wall member 189 is normally urged to the position illustrated in FIGURE 21 by a compression spring 192 disposed between the fitting 191 and the respective bottom wall member 189.

Each cup-like member 58 is interconnected by suitable passages formed in the turret head 59 to the internal peripheral surface 193 of a fixed member 194 surrounding the shaft-like portion 182 of the turret head 59.

The fixed member 194 has a passage 195 formed therein in the manner illustrated in FIGURE 23 and receives air from a line 196. The air passage 195 leads to a transversely disposed passage 197 interconnected to the peripheral surface 193 of the fitting 194.

However, a slidable valve member 198 is disposed in the passage 197 and normally closes the air passage 195 from the passage 197 by being urged inwardly by a compression spring 199 disposed between an enlarged head 200 of the valve member 198 and a bracket 201 fixed to the block 183.

The turret head 59 has a plurality of outwardly directed cam tangs 202 formed on the outer surface thereof in the manner illustrated in FIGURE 3 whereby as the turret head 59 rotates relative to the valve member 198, one of the tangs 202 eventually comes into contact with the enlarged head 200 of the valve member 198 to push the same to the right in the manner illustrated in FIGURE 23 to permit the air to enter the passage 197 and pass through the respective passage means 203 in the turret head to the respective cup 58 disposed adjacent the discharge tube 65 so that the air flowing through the turret head 59 to the particular cup 58 will blow the completed capsule 44 into the discharge tube 65.

Therefore, it can be seen that each time a new cup 59 is moved to the station 63, the valve member 198 is moved to the right to permit air to eject the completed capsule 44 into the discharge tube 65.

After each incompleted capsule 56 has been received in a cup 58 of the turret head 59, the turret head 59 is adapted to index that cup to the station 61 wherein no operation takes place on the incompleted capsule 56. Thereafter, that particular cup 58 is indexed to the station 62 wherein the pleats 48 of the capsule 56 are flattened in overlapping relation to complete the capsule 44 of this invention.

However, as the particular cup 58 is indexed from the station 60 to the station 61, the cup 58 travels through substantially a horizontal direction whereby such whipping action of the turret head 59 might tend to throw the capsule 56 out of the open end thereof.

Therefore, a stationary curved guide 203 is carried by the frame means 41 and tends to hold the capsule 56 in the particular cup 58 as the same travels from the station 60 to the station 61.

After the capsule has the pleats 48 thereof flattened at the station 62 by the pleat flattener 64 in a manner hereinafter described, the particular cup 58 is indexed by the head 59 to the station 63 whereby air is directed to the bottom of the particular cup 58 in the manner previously described by the valve means 198 to eject the completed capsule 44 into the discharge chute 65 leading to a desired hopper or other structure as desired.

MEANS FOR SEQUENTIALLY INDEXING THE TURRET HEAD 59

As illustrated in FIGURES 1 and 25, the drive chain 115 passes over a sprocket wheel 204 carried on a shaft rotatably mounted in the block 183 by bearing means 206.

The shaft 205 has a cam member 207 fixed on one end thereof by a splined means 208 and carries a cam roller 209 in a manner similar to the cam roller 117 previously described.

The shaft 188, which is journaled in the block 183 by bearing means 210, carries a wheel 211 as illustrated in FIGURES 25, 26 and 27.

The wheel 211 has a plurality of radially disposed slots 212 formed therein and adapted to respectively receive the cam member 209 of the wheel 207 as the wheel 207 rotates.

Thus, it can be seen in FIGURES 26 and 27 that as the wheel 207 rotates, the cam member 209 thereof eventually enters a slot 212 of the wheel 211 and causes partial rotation thereof until the cam member 209 is again removed from that particular slot 212 whereby the wheel 207 can continuously rotate and the shaft 188 is sequentially rotated in the above manner.

In this manner, the turret head 59 is adapted to be sequentially indexed between the stations 60–63 in the proper timed relation with the other operating mechanism of the apparatus 40.

THE PLEAT FLATTENING MEANS 64

As illustrated in FIGURES 21 and 24, a brace 213 extends upwardly from the block 183 and slidably carries a bracket 214 having the pleat-forming member 64 carried in cantilevered fashion thereon.

The pleat-forming member 64 is substantially frusto-conical in configuration and has an inner passage 215 passing down the same and leading to the corners thereof by branch passages 216 for a purpose hereinafter described.

The configuration of the external peripheral surface of the pleat-forming member 64 is adapted to cooperate with the internal surface 217 of each cup 58 in the manner illustrated in FIGURE 24 whereby when the pleat-forming member 64 is moved vertically downwardly into a cup 58 disposed at the station 62, the external peripheral surface of the pleat-flattening member 64 compacts the incompleted capsule 56 against the internal peripheral surface 217 of the cup 58 to flatten the pleats 48 thereof in overlapping relation to complete the capsule 44, the bottom wall member 189 of the particular cup 58 moving downwardly therewith to permit the capsule 44 to be tightly compacted against the internal peripheral surface 217 of the cup 58.

Thereafter, when the pleat-flattening member 64 is raised vertically upwardly, the bottom member 189 is moved upwardly by the compression spring 192 to loosen the capsule 44 relative to the cup 58 so that the same can be ejected at the station 63 in the manner previously described.

As the pleat-forming member 64 is received in the capsule 56 to flatten the pleats 48 thereof, the air trapped between the capsule 56 and the pleat-flattening member 64 is adapted to be expelled to the atmosphere through the passage means 216 and 215 of the pleat-flattening member 64.

In addition, or alternately, air can be subsequently directed downwardly through the passage 215 and branch passages 216 of the pleat-flattening member 64 to permit the completed capsule 44 to be thrown off the end of the pleat-flattening member 64 before the same is raised out of the particular cup 58 to assure that the completed capsule 44 will not remain on the pleat-flattening member 64 as the same is being raised upwardly after completing its pleat-flattening operation.

MEANS FOR MOVING THE PLEAT-FLATTENING MEMBER 64 UPWARDLY AND DOWNWARDLY

As illustrated in FIGURES 21 and 24, an adjustable tie bar 218 has one end 219 thereof pivotally interconnected to the bracket 214 and the other end 220 thereof pivotally interconnected to one end 221 of a lever 222.

The lever 222 has a bore 223 passing therethrough and receiving an eccentric or cam 224 mounted on the shaft 205 in the manner illustrated in FIGURES 24 and 25.

The other end 225 of the lever 222 is pivotally interconnected to a link 226 by a pivot pin 227, the other end of the link 226 being pivotally interconnected to the block 183 by a pivot pin 228.

Thus, as the shaft 205 is rotated by the sprocket wheel 204, the lever 222 has the end 221 thereof oscillated upwardly and downwardly in the manner illustrated in FIGURE 24 to reciprocate the pleat-forming member 64 upwardly and downwardly to accomplish the pleat-flattening operation in the manner previously described.

THE OPERATION OF THE APPARATUS 40 OF THIS INVENTION

Referring now to FIGURE 1, it can be seen that the trip of material 43 is adapted to be continuously drawn from the supply roll 42 by means of the oscillating roll 49 so that the feed rolls 51 and 52 can intermittently feed the leading end of the strip of material 43 between the die members 53 and 54.

When an unblanked portion of the sheet of material 43 is fed between the die members 53 and 54, the die member 54 is moved to the left by the plunger 150 to cause the die members 53 and 54 to cut a circular blank 55 from the unblanked portion of the strip of material 43 and radially pleat the outer peripheral portion thereof. Thereafter, the die member 57 is moved through the die members 54 and 53 to form the pleated blank 55 into the incompleted capsule 56 illustrated in FIGURE 1, the die member 57 moving the incompleted capsule 56 into the guide chute 57 and ejecting the same through the guide chute 57 into the cup 58 of the turret head 59 disposed at the station 60.

Thereafter, the die member 57 is moved back to the right and the die members 53 and 54 separate to permit another unblanked portion of the strip of material 43 to be fed therebetween to be formed into an incompleted capsule 56 in the manner previously described.

However, during such operation, the cup 58 at station 60 is subsequently indexed to station 61 and then to station 62 wherein the pleat-flattening member 64 is moved vertically downwardly in the manner previously described to flatten the pleats 48 of the capsule 56 in overlapping relation in the manner illustrated by the reference numeral 44 in FIGURE 1 to complete the capsule 44.

Thereafter, the particular cup 58 is indexed by the turret head 59 in the manner previously described from the station 62 to the station 63 whereby the completed capsule 44 is ejected into the discharge tube 65.

Therefore, it can be seen that the apparatus and method 40 of this invention provides improved means for making the completed capsule 44 in a minimum of time so that the apparatus 40 has a high production rate when compared with prior known apparatus.

EMBODIMENT OF FIGURES 28–35

Another method and apparatus of this invention is generally indicated by the reference numeral 300 in FIGURES 28–35 and comprises a stationary platform 301 adapted to rotatably mount a supply roll (not shown) in substantially the same manner as the supply roll 42 previously described so that the strip of metallic foil 43 can be fed into the apparatus 300 in a manner hereinafter described to form the capsules 44 in a manner hereinafter described.

Since certain parts of the apparatus 300 of this invention are substantially the same as like parts in the apparatus 40 previously described, like parts will be indicated by like reference numerals followed by the reference letter A.

As illustrated in FIGURE 28, the strip of material 43 is adapted to be fed around part of a first roll 49A and through the nip defined between the roll 49A and a cooperating roll 50A, the roll 49A being adapted to oscillate about the axis of rotation of the roll 50A in substantially the same manner as the roll 49 previously described and continuously draw the strip of material 43 from the supply roll even though the feeding edge of the strip of material 43 is being sequentially fed through the apparatus 300.

After the strip of material 43 passes through the nip of the rolls 49A and 50A, the same passes through a nip defined between the roll 50A and a feed roll 302 sequentially driven in a manner hereinafter described by a drive chain 303 passing around a sprocket on the roll 302 and a rotatable member 304.

In this manner, the strip of material 43 is adapted to be sequentially fed down between a pair of cooperating die members 53A and 54A to be subsequently blanked into a circular blank and have the outer peripheral portion thereof pleated when the die member 54A is drawn toward the die member 54A in a manner hereinafter described.

Thereafter, the third die member 57A carried by the apparatus 300 is adapted to move from the position illustrated in FIGURE 28 through the openings 130A and 124A of the die members 54A and 53A to form the incompleted capsule 56 in the manner previously described and eject the same in the manner previously described into a discharge guide chute 305 which directs the incompleted capsule 56 into a cup 306 movable over the platform 301 in a manner hereinafter described.

As illustrated in FIGURE 30, three cups 306 are provided and are respectively interconnected to a hub 307 rotatably mounted to the platform 301 in a manner hereinafter described whereby the hub 307 is adapted to be indexed between three stations 308, 309, and 310, the particular cup 306 having the incompleted capsule 56 received therein from the die member 57A at the station 308, having the pleats of the incompleted capsule 56 flattened at the station 309 and having the completed capsule 44 ejected through the platform 301 in a manner hereinafter described at the station 310.

Therefore, it can be seen that the method and apparatus 300 of this invention forms the pleated capsule 44 in substantially the same manner as the apparatus 40 previously described whereby the apparatus 300 is adapted to produce the capsules 44 at twice the rate as prior known apparatus.

The particular details of the apparatus 300 of this invention will now be described.

MEANS FOR SEQUENTIALLY DRIVING THE FEED ROLLER 302

As illustrated in FIGURES 28 and 29, a suitable drive motor 311 drives a pulley 312 through the means of a drive belt 313 whereby the pulley 312 drives a shaft 314 leading into a gear box 315.

The drive out of the gear box is provided by a shaft 316 which drives a belt 317, the belt 317, in turn, driving a drive shaft 318.

The drive shaft 318 has a beveled gear 319 fixed thereon which is disposed in meshing relation with another beveled gear 320 carried by an output shaft 321, the output shaft 321 driving a worm gear 322 disposed in meshing relation with a worm gear 323 carried on a shaft 324.

The shaft 324 carries a cam plate 325 having a cam member or roller 326 thereon to sequentially drive the wheel 304 in a manner similar to the cam drive of the wheel 120 of FIGURE 7 previously described.

In particular, the wheel 304 has a plurality of radially disposed slots 327 formed therein and in which the cam roller 326 enters to partially drive the wheel 304 and, thus, intermittently drive the feed roller 302.

In this manner, the leading end of the strip of material 43 is sequentially fed between the die members 53A and 54A to permit the apparatus 300 to sequentially form the capsules 44 in the manner previously described.

MEANS FOR OSCILLATING THE ROLLER 49A

As previously set forth, the roller 49A is oscillated about the axis of rotation of the roller 50A to permit a constant feed of the strip of material 43 from a supply roll thereof even though the leading end of the strip of material 43 is being intermittently fed between the die members 53A and 54A by the intermittently driven feed roller 302.

Figure 31:
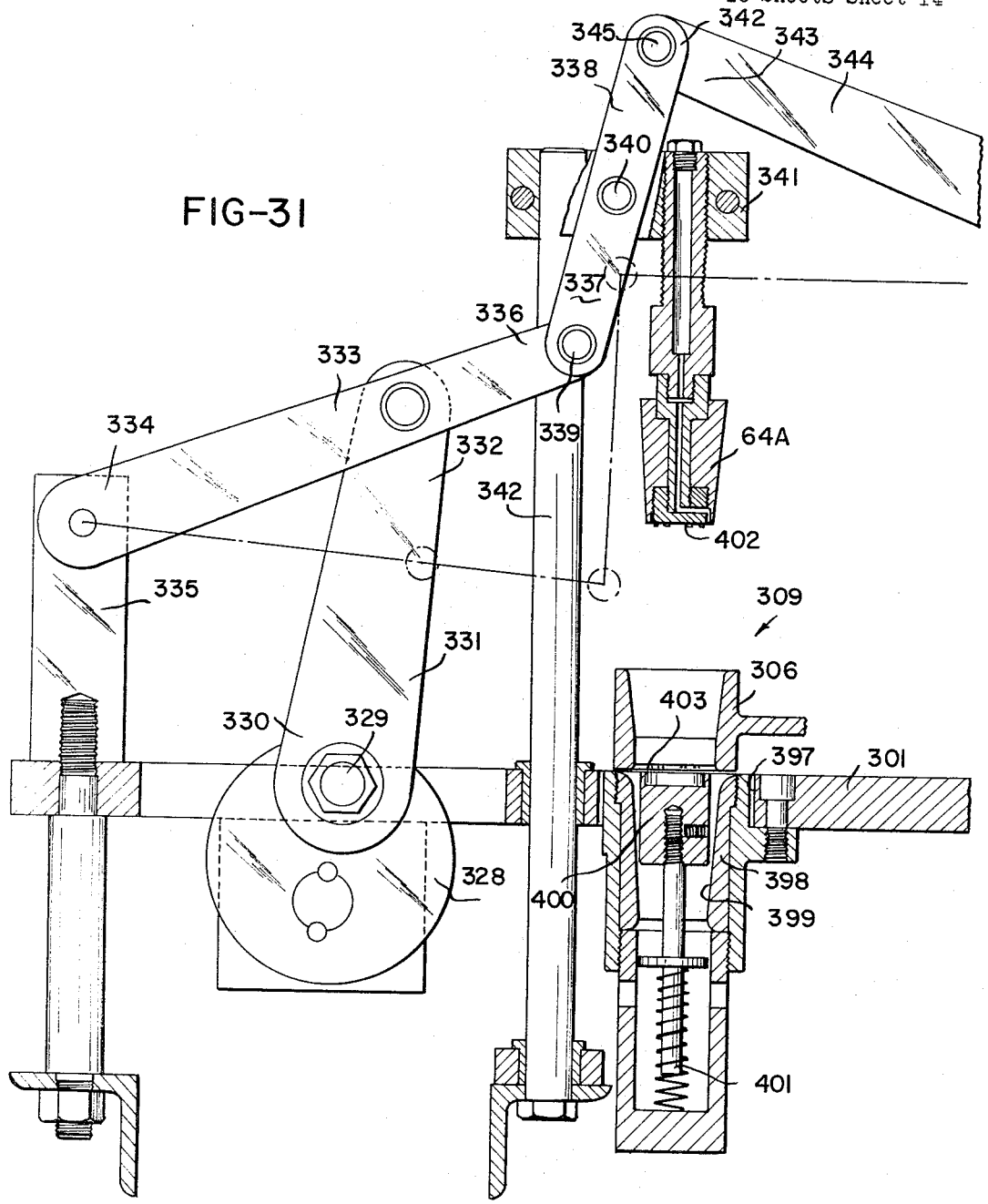
FIGURE 31 is an enlarged, fragmentary, cross-sectional view taken on line 31—31 of FIGURE 30.

As illustrated in FIGURE 29, the shaft 318 has a cam wheel 328 mounted on one end thereof, the cam wheel 328 being provided with a pivot pin 329 extending off center therefrom and being pivotally interconnected to one end 330 of a lever 331 in the manner illustrated in FIGURE 31.

The other end 332 of the lever 331 is pivotally interconnected to an intermediate point of a link 333 pivotally mounted at one end 334 to a support post 335 of the platform 301, the other end 336 of the lever 333 being pivotally mounted to one end 337 of a lever 338 by a pivot pin 339.

The lever 338 is pivotally mounted by a pivot shaft 340 to a movable block 341 carried on a support post 342, the block 341 carrying the pleat-forming member 64A for a purpose hereinafter described.

The other end 342 of the lever 338 is pivotally interconnected to one end 343 of a lever 344 by a pivot pin 345, the lever 344 having the other end 346 thereof, FIGURE 28, interconnected to linkage mechanism 347 which, in turn, is interconnected to a crank arm 83A of the roller 50A.

Thus, as the lever 331 moves upwardly and downwardly, the same causes the lever 344 to oscillate the crank arm 83A and cause oscillation of the roller 49A about the axis of rotation of the roller 50A in the same manner that the roller 49 is oscillated relative to the roller 50 in the apparatus 40 previously described.

MEANS FOR MOVING THE DIE MEMBER 54A TOWARD AND AWAY FROM THE DIE MEMBER 53A

As illustrated in FIGURES 28 and 32, the die member 53A is fixed to frame structure 348 carried by the platform 301 and carries a plurality of bearing means 349.

A plurality of rods 350 pass through the bearing means 349 of the fixed die member 53A and respectively interconnect the die member 54A to a plate 351.

The discharge chute 305 is interconnected to the plate 351 and is adapted to be moved to the right and to the left in FIGURES 28 and 32 in a manner hereinafter described to cause the die member 54A to move to the right end and to the left to accomplish the blanking and pleating operation in the manner previously described for the die members 53 and 54.

In particular, it can be seen in FIGURES 28 and 29 that the shaft 318 has a worm gear 352 mounted thereon which is disposed in meshing relation with a worm gear 353 carried on a shaft 354 rotatably mounted to the platform 301 by bearing means 355 and 356.

The shaft 354 has an eccentric portion 357 at one end thereof which is rotatably mounted in a lever 358 by bearing means 359, the lever 358 being interconnected to the discharge chute 305 by linkage means 360 in the manner illustrated in FIGURE 28.

Thus, upon rotation of the shaft 354, the eccentric 357 rotates and causes the discharge chute 305 to oscillate back and forth to the right and to the left to cause the die member 54A to be moved sequentially to the left to cooperate with the die member 53A in blanking a portion of the strip of material 43 and radially pleating the outer peripheral portion thereof in the manner previously described for the die members 53 and 54.

Thus, by controlling the throw of the eccentric 357, it can be seen that the die member 54A can be drawn to a predetermined distance relative to the die member 53A so that the blank of material formed therebetween will not be so compacted between the die members 54A and 53A that the die member 57A will tear out the center of the same when the same moves through the openings 130A and 124A of the die members 53A and 54A in the manner of the prior art.

MEANS FOR MOVING THE DIE MEMBER 57A RELATIVE TO THE DIE MEMBERS 53A AND 54A

As illustated in FIGURES 28, 30 and 32, the eccentric 357 rotatably carries a cam plate 361 on a shaft or pin 362 thereof which is disposed off center relative to the eccentric 357.

A tie bar 363 is interconnected to the cam plate 361 and is joined to one end 364 of a link 365 pivotally mounted to the platform 301 by a pivot pin 366 intermediate its ends.

The other end 367 of the link 365 is interconnected to a link 368 which is, in turn, interconnected to a link 369 pivotally mounted to the platform 301 intermediate its ends by a pivot pin 370.

The link 369 has the end 371 thereof pivotally mounted to an end 372 of a link 373 by a pivot pin 374, the link 373 having its middle portion pivotally attached to the fitting 160A of the die member 57A by a pivot pin 375.

The other end 376 of the link 373 is pivotally interconnected to a lever 377 by a pivot pin 378, the lever 377 having its other end 379 pivotally interconnected to the platform 301 by a pivot pin 380.

Therefore, it can be seen that as the cam member 361 is rotated by the eccentric 357, the die member 57A is drawn from the position illustrated in FIGURE 30 to the position illustrated in FIGURE 32 to form the incompleted capsule 56 in the manner previously described and discharge the same in the chute 305 leading to a cup 306 disposed at the station 308.

MEANS FOR INDEXING THE HUB 307

As illustrated in FIGURES 29 and 33, the shaft 321 has a worm gear 381 fixed thereto and disposed in meshing relation with a worm gear 382 carried by a shaft 383 rotatably mounted in the platform 301 by bearing means 384.

The shaft means 383 slidably carries a gear means 385 normally disposed in meshing relation with the gear means 386 carried on a shaft 387 rotatably mounted to the platform 301 by bearing means 388.

However, the gear 385 carries a camming surface 389 which acts against suitable structure to raise and lower the gear 385 into and out of engagement with the gear 386 to cause sequential operation of rotation of the shaft 387 even though the gear 385 is being continuously rotated by the rotating shaft 383.

The shaft 387 carries a gear 390 disposed in meshing relation with a gear 391 carried by a shaft 392 rotatably mounted to the platform 301 by bearing means 393.

The gear 392 is, in turn, disposed in meshing relation with a gear 394 fixed to a shaft 395 rotatably mounted in the platform 301 by bearing means 396, the shaft 395 being attached to the hub 307 radially carrying the cups 306 in the manner previously described.

Therefore, it can be seen that even though the shaft 321 is being continuously rotated by the drive means 311, the hub 307 carrying the cups 306 is sequentially indexed between the stations 308–310 in proper timed relation to carry an incompleted capsule 56 at the station 308 to the station 309 to have the pleats thereof flattened and, thereafter, to carry the completed capsule 44 to the station 310 for discharge of the same.

THE MEANS FOR RECIPROCATING THE PLEAT-FLATTENING MEMBER 64A

Referring now to FIGURE 31, it has been previously pointed out that the lever 338 is pivotally mounted by the pivot pin 340 to a block 341 slidably disposed on a support post 342 carried by the platform 301.

Therefore, as the cam wheel 328 rotates, the same causes the pivot pin 340 to move upwardly and downwardly relative to the post 342 and carry the pleat-flattening member 64A therewith to flatten the pleats of the incomplete capsule 56 disposed in the cup 306 located at the station 309.

THE PLEAT FLATTENING OPERATION

The platform 301 has an opening 397 formed therein at the station 309 in the manner illustrated in FIGURE 31 whereby a female die member 398 is disposed in the opening 397 and is fixed to the platform 301, the female die member 398 having an internal peripheral surface 399 which cooperates with the external peripheral surface of the pleat-flattening member 64A to flatten the pleats 48 of the incomplete capsule 56 in the manner previously described.

A member 400 is normally disposed in the female die member 398 in the position illustrated in FIGURE 31 by means of a compression spring 401 whereby the same normally holds the capsule 56 above the upper surface of the platform 301 so that as the cup 306 is indexed, the same can carry the capsule 56 therewith.

However, when the pleat-flattening member 64A is lowered into the cup 306, the same continues to move downwardly into the female die member 398 and carries the member 400 therewith until the pleat-flattening member 64A cooperates with the surface 399 of the female die member 398 to completely flatten the pleats of the now completed capsule 44.

If desired, the bottom surface 402 of the pleat-flattening member 64A and the top surface 403 of the member 400 can be so constructed and arranged that the same completely emboss the closed end of the capsule 44 at the same time that the pleat-flattening member 64A is flattening the pleats 48 thereof.

Thus, it can be seen that after the pleat-flattening member 64A has been reciprocated downwardly into the female die member 398 at the station 309 of the apparatus 300, the same is moved upwardly to the position illustrated in full lines in FIGURE 31 whereby the member 400, under the influence of the compression spring 401, moves back to the position illustrated in FIGURE 31 to raise the completed capsule 44 back into the cup 306 so that the cup 306 can be then indexed to the station 310 for ejection of the completed capsule 44.

MEANS FOR EJECTING THE CAPSULES 44 AT STATION 310

As illustrated in FIGURES 29 and 34, the platform 301 has an opening 404 passing therethrough at the station 310 and is provided with a guide chute 405 leading directly over a pair of hopper members 406 respectively mounted on a shaft 407 rotatably mounted in the platform 301 in the region of the reference numeral 408.

Each hopper member 406 comprises a substantially tubular structure having an elongated slot 409 extending between the top and bottom thereof so that a person can reach his hand in the slot 409 and lift the capsules out of the same when that particular hopper member 406 is disposed in the upper position illustrated in FIGURE 29 while the other hopper member 406 is disposed below the opening 404 in the platform 301 to receive the completed capsules 44.

The hopper members 406 are adapted to be automatically sequenced under the opening 404 in a desired time relation so that when one of the hopper members 406 is completely filled, the same is indexed away from the opening 404 to a position where the capsules can be removed and the other hopper member 406 is moved beneath the opening 404 to be filled by the completed capsules 44 being ejected from the cups 306 by merely falling by gravity into the discharge chute 405.

In particular, the shaft 407 has a lever 410 fixed thereto and interconnected to a piston 411 of a piston and cylinder arrangement 412, FIGURE 29, which when moved in a direction indicated by the arrows, moves one of the hopper members 406 under the opening 404 and, thereafter, moves that hopper member 406 away from the opening 404 when the hopper 406 has been filled in the manner previously described.

One means for sequentially operating the piston and cylinder arrangement 412 in correct timed relation with the operation of the apparatus 300 so that when each hopper 406 is filled, the same is moved away from the opening 404 and another hopper member 406 is placed under the opening 404, is illustrated in FIGURES 29 and 35 wherein the shaft 324 carries a worm gear 413 on one end thereof and which is disposed in meshing relation with a larger worm gear 414 carried by a shaft 415 suspended below the platform 301.

The gear wheel 414 carries an actuating pin 416 which is adapted to sequentially actuate a switch 417 which, in turn, causes actuation of the piston and cylinder arrangement 412 to either move the piston 411 outwardly or inwardly depending upon the particular sequence being performed.

For example, with the piston and cylinder arrangement 412 disposed in the position illustrated in FIGURE 29, when the actuating pin 416 of the gear wheel 414 makes contact with the switch 417, the piston 411 is drawn into the cylinder of the piston and cylinder arrangement 412 to cause a reversal of the hopper members 406.

Thereafter, the next time the actuating pin 416 hits the switch 417, the piston 411 is extended to cause reversal of the hopper members 406.

THE OPERATION OF THE APPARATUS 300

Referring now to FIGURES 28 and 30, the roller 302 intermittently feeds the strip of material 43 between the opened die members 53A and 54A whereby an unblanked portion thereof is adapted to have a circular blank cut therefrom when the die member 54A is moved toward the die member 53A in the manner previously described.

Thereafter, the die member 57A moves through the openings 130A and 124A in the die members 54A and 53A to form the blank into the incomplete capsule 56 and eject the same through the discharge chute 305 into a cup 306 at the station 310.

Thereafter, the particular cup 306 is indexed by the hub 307 from station 308 to the station 309.

While the particular cup 306 is being indexed from the station 308 to the station 309, means are provided for spreading the incomplete capsule 56 so that the same will be fully opened to receive the pleat-flattening member 64A without having the member 64A accidentally crush the same.

In particular, it can be seen in FIGURES 30 and 30A that a nozzle 418 is carried by the platform 301 and is directed downwardly so that as the particular cup 306 passes beneath the same, air issuing from the opened end 419 of the nozzle 418 flows into the opened end of the incomplete capsule 56 and spreads the opened end thereof tightly against the cup 306 so that when the same reaches the station 309, the pleat-flattening member 64A can be fully received inside the incomplete capsule 56 to form the pleat-flattening and end-embossing operation in the manner previously described.

Thereafter, the particular cup 306 is indexed from the station 309 to the station 310 whereby the completed capsule 44 falls through the opening 404 in the platform 401 into one of the hopper means 406 disposed below the opening 404.

Therefore, it can be seen that this invention provides improved methods and apparatus for forming pleated capsules or the like, the methods and apparatus of this invention being readily adaptable to form the pleated capsules at substantially twice the rate as prior known methods and apparatus.

While the form of the invention now preferred has been disclosed as required by the statutes, other forms may be used, all coming within the scope of the claims which follow.

What is claimed is:

1. Apparatus for forming a pleated capsule from a sheet of material comprising a first die member having an opening passing therethrough, a second die member having an opening passing therethrough, means for feeding said sheet of material between said die members, means for moving said second die member towards said first die member to cut a blank from said sheet of material and pleat the outer peripheral portion of said blank, a third die member, means for moving said third die member through the opening in said second die member and against said blank to push said blank through the opening in said first die member to form said blank into said pleated capsule, said first die member comprising a plate having a plurality of slots provided therein and a plurality of apertures therein, a plurality of pleat-forming members disposed in said slots, and a plurality of wedge members disposed in said apertures to compress said plate between said slots to hold said pleat-forming members in said slots.

2. Apparatus for forming a pleated capsule from a sheet of material comprising a first die member, a second die member, means for feeding said sheet of material between said die member, means for moving one of said die members toward the other die member to cut a circular blank from said sheet of material and radially pleat the outer peripheral portion of said blank, a third die member, and means for moving said third die member against said blank and through said first die member to form said blank into said pleated capsule, said first and second die members forming said radial pleats at substantially right angles to said blank while said third and first die members form said capsule with said pleats thereof angularly disposed relative to the side walls of said capsule.

3. Apparatus for forming a pleated capsule from a sheet of material comprising a first die member, a second die member, a rotatable roll of said sheet material, first means disposed between said roll and said die members to keep feeding said sheet of material from said roll at a constant rate when the leading portion of said sheet of material is held from movement, second means disposed between said first means and said die members to intermittently feed said leading portion of said sheet of material between said die members, means for moving one of said die members toward the other die member to cut a circular blank from an unblanked portion of said sheet of material that had been indexed between said die members by said second means and to radially pleat the outer peripheral portion of said blank, a third die member, and means for moving said third die member against said blank and through one of said first and second die members to form said blank into said pleated capsule.

4. Apparatus as set forth in claim 3 wherein said first means comprises a roller having said sheet of material feed around the same, and means for oscillating said roller.

5. Apparatus as set forth in claim 3 wherein said first means comprises a first roller, a second roller cooperating with said first roller to define a nip therebetween whereby said sheet of material is fed around said first roller and through said nip, and means for oscillating said first roller about the axis of rotation of said second roller.

6. Apparatus as set forth in claim 5 wherein said second means comprises a third roller defining a nip with said second roller of said first means, said third roller being intermittently rotated.

7. Apparatus as set forth in claim 3 wherein said second means comprises a pair of rollers cooperating together to define a nip therebetween which receives said sheet of material, and means for intermittently rotating one of said rollers.

8. Apparatus as set forth in claim 7 wherein the other of said rollers is oscillatable, and means tend to urge said other roller toward said one roller.

9. Apparatus as set forth in claim 3 wherein said roll of sheet material is mounted on a roller rotatably carried on a pair of opposed shafts, a pair of retainers respectively carried by said shafts and having openings passing therethrough, a pair of rods carried by said apparatus and having reduced ends respectively received in said openings whereby said rods carry said roll of sheet material.

10. Apparatus as set forth in claim 9 wherein handles project from said shafts.

11. Apparatus for forming a pleated capsule from a sheet of material comprising a first die member, a second die member, means for feeding said sheet of material between said die members, means for moving one of said die members toward the other die member to cut a circular blank from said sheet of material and radially pleat the outer peripheral portion of said blank, a third die member having a frusto-conical configuration with a movable end wall, means for moving said third die member against said blank and through one of said first and second die members to form said blank into a frusto-conical capsule, and means for moving the movable end wall of said third die member outwardly to loosen said capsule on said third die member.

12. Apparatus as set forth in claim 11 wherein means are provided for forcing fluid under pressure through said third die member to eject said loosened capsule from said third die member.

13. Apparatus for forming a pleated capsule from a sheet of material comprising a first die member, a second die member, means for feeding said sheet of material between said die members, means for moving one of said die members toward the other die member to cut a circular blank from said sheet of material and radially pleat the outer peripheral portion of said blank, a third die member, means for moving said third die member against said blank and through one of said first and second die members to form said blank into a pleated capsule, indexable means for receiving said capsule from said third die member, means for indexing said indexable means to a second station, and means for flattening the pleats of said capsule at said second station.

14. Apparatus as set forth in claim 13 wherein said last-named means also embosses the closed end of said capsule.

15. Apparatus as set forth in claim 13 wherein means are provided for spreading said capsule out as said capsule is moved to said second station.

16. Apparatus as set forth in claim 15 wherein said last-named means comprises a jet of air being forced in the open end of said capsule.

17. Apparatus for forming a pleated capsule from a sheet of material comprising a first die member, a second die member, means for feeding said sheet of material between said die members, means for moving one of said die members toward the other die member to cut a circular blank from said sheet of material and radially pleat the outer peripheral portion of said blank, a third die member, means for moving said third die member against said blank and through one of said first and second die members to form said blank into a pleated capsule, an indexable turret-head having outwardly facing cups, means for indexing said head to position one of said cups at a first station to receive said capsule from third die member, for indexing said one cup to a second station and then for indexing said one cup to a third station, means for flattening the pleats of said capsule when said capsule is indexed to said second station, and means for ejecting said capsule from said one cup when said one cup is indexed to said third station.

18. Apparatus as set forth in claim 17 wherein a stationary bracket holds said capsule in said one cup as said one cup is indexed from said one station to said second station.

19. Apparatus as set forth in claim 17 wherein said head has a movable bottom wall for each cup thereof.

20. Apparatus as set forth in claim 17 wherein each cup has a tapering internal peripheral surface and said pleat flattening means has a tapering external peripheral surface cooperable with said surfaces of said cups to flatten said pleats of said capsule.

21. Apparatus as set forth in claim 17 wherein said means for ejecting said capsule at said third station includes fluid pressure means.

22. Apparatus as set forth in claim 21 wherein a dispensing tube has an open end adjacent said one cup when said one cup is at said third station and said fluid pressure means blows said capsule into said open end of said tube.

23. Apparatus for forming a pleated capsule from a sheet of material comprising a first die member, a second die member, means for feeding said sheet of material between said die members, means for moving one of said die members toward the other die member to cut a circular blank from said sheet of material and radially pleat the outer peripheral portion of said blank, a third die member, means for moving said third die member against said blank and through one of said first and second die members to form said blank into a pleated capsule, a supporting table, an indexable member movable over said table and having cups provided with opposed opened ends, means for indexing said inexable member to position one cup at a first station to receive said capsule from said third die member, for indexing said one cup to a second station and then for indexing said one cup to a third station, means for flattening the pleats of said capsule when said capsule is indexed to said second station, and means for ejecting said capsule from said one cup when said one cup is indexed to said third station.

24. Apparatus as set forth in claim 23 wherein means are provided for spreading said capsule in said one cup as said one cup is indexed from said one station to said second station.

25. Apparatus as set forth in claim 23 wherein an opening is provided in said table at said second station, a first die means is disposed below said opening to receive said capsule when said capsule is indexed to said second station, and a second die means is adapted to force said capsule into said first die means to flatten said pleats thereof.

26. Apparatus as set forth in claim 25 wherein said first die means returns said capsule above said table after said second die means has moved away.

27. Apparatus as set forth in claim 25 wherein said first and second die means cooperate together to emboss the closed end of said capsule.

28. Apparatus as set forth in claim 23 wherein an opening is provided in said table at said third station whereby said capsule falls by gravity through said opening when said capsule is indexed to said third station.

29. Apparatus as set forth in claim 28 wherein hopper means are disposed below said opening to receive said capsules ejected from said cups.

30. Apparatus as set forth in claim 29 wherein said hopper means includes a pair of tubular members adapted to be selectively indexed beneath said opening.

31. A die member for forming a pleated capsule or the like comprising a plate-like member having a surface interrupted by a plurality of slots and apertures, a plurality of pleat-forming members respectively disposed in said slots, and a plurality of wedge members respectively disposed in said apertures and tending to close said slots whereby said pleat-forming members are held in said slots.

32. A die member as set forth in claim 31 wherein said plate-like member has an opening passing therethrough, and wherein said pleat-forming members extend into said opening.

References Cited
UNITED STATES PATENTS

| | | | |
|---|---|---|---|
| 1,915,164 | 1/1933 | Oren et al. | 77—345 |
| 2,739,557 | 3/1956 | Staubitz | 72—348 |

CHARLES W. LANHAM, *Primary Examiner.*

R. D. GREFE, *Assistant Examiner.*